US008801208B2

(12) United States Patent
Takata

(10) Patent No.: US 8,801,208 B2
(45) Date of Patent: Aug. 12, 2014

(54) LIGHTING DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 383 days.

(21) Appl. No.: 13/258,088

(22) PCT Filed: Dec. 21, 2009

(86) PCT No.: PCT/JP2009/071220
§ 371 (c)(1), (2), (4) Date: Sep. 21, 2011

(87) PCT Pub. No.: WO2010/113363
PCT Pub. Date: Oct. 7, 2010

(65) Prior Publication Data
US 2012/0044439 A1 Feb. 23, 2012

(30) Foreign Application Priority Data

Apr. 2, 2009 (JP) ................................. 2009-090357

(51) Int. Cl.
G09F 13/04 (2006.01)
G09F 13/08 (2006.01)
F21V 7/04 (2006.01)
G02F 1/1335 (2006.01)

(52) U.S. Cl.
CPC ........ *G02F 1/133606* (2013.01); *G02B 6/0016* (2013.01); *G02B 6/0018* (2013.01); *G02B 6/0025* (2013.01); *G02F 1/133604* (2013.01); *G02F 1/133609* (2013.01)
USPC ........................... 362/97.2; 362/97.1; 362/624

(58) Field of Classification Search
CPC .................... G02F 1/133602; G02F 1/133609; G02F 1/133606; G02B 6/0016; G02B 6/0018; G02B 6/0025
USPC ......................................... 362/97.2, 97.1, 624
See application file for complete search history.

(56) References Cited

U.S. PATENT DOCUMENTS 7,068,332 B2 * 6/2006 Liu et al. .......................... 349/64
7,726,828 B2 * 6/2010 Sato .............................. 362/97.3
(Continued)

FOREIGN PATENT DOCUMENTS

JP 2005-117023 A 4/2005
JP 2007-294170 A 11/2007

OTHER PUBLICATIONS

Official Communication issued in International Patent Application No. PCT/JP2009/071220, mailed on Apr. 13, 2010.

*Primary Examiner* — David J Makiya
(74) *Attorney, Agent, or Firm* — Keating & Bennett, LLP

(57) ABSTRACT

A lighting device 12 includes a light source 17, a chassis 14 housing the light source 17 and an optical member 15a provided to face the light source 17. The optical member 15a includes a light source overlapping portion DN that overlaps a light source installation area of the chassis 14 where the light source 17 is arranged and an empty area overlapping portion DN that overlaps an empty area LN of the chassis 14 where no light source 17 is arranged. A light reflecting portion 40 is formed on at least the light source overlapping portion DA such that light reflectance of the light source overlapping portion DA is relatively higher than that of the empty area overlapping portion DN. A color adjustment portion 50 is formed on the optical member 15a to adjust color of the light source overlapping portion DA and the empty area overlapping portion DN.

10 Claims, 32 Drawing Sheets

(56) References Cited

U.S. PATENT DOCUMENTS

| | | | |
|---|---|---|---|
| 8,054,405 B2 * | 11/2011 | Takata | 349/62 |
| 8,430,519 B2 * | 4/2013 | Takata | 362/97.1 |
| 8,556,487 B2 * | 10/2013 | Chiu et al. | 362/609 |
| 2003/0072157 A1 * | 4/2003 | Nolan et al. | 362/245 |
| 2005/0219836 A1 * | 10/2005 | Hung | 362/97 |
| 2006/0215386 A1 | 9/2006 | Hatanaka et al. | |
| 2007/0086181 A1 | 4/2007 | Hatanaka et al. | |
| 2008/0002391 A1 * | 1/2008 | Lee | 362/97 |
| 2008/0151554 A1 * | 6/2008 | Burkard | 362/330 |
| 2009/0034230 A1 * | 2/2009 | Lim et al. | 362/84 |

* cited by examiner

FIG.21
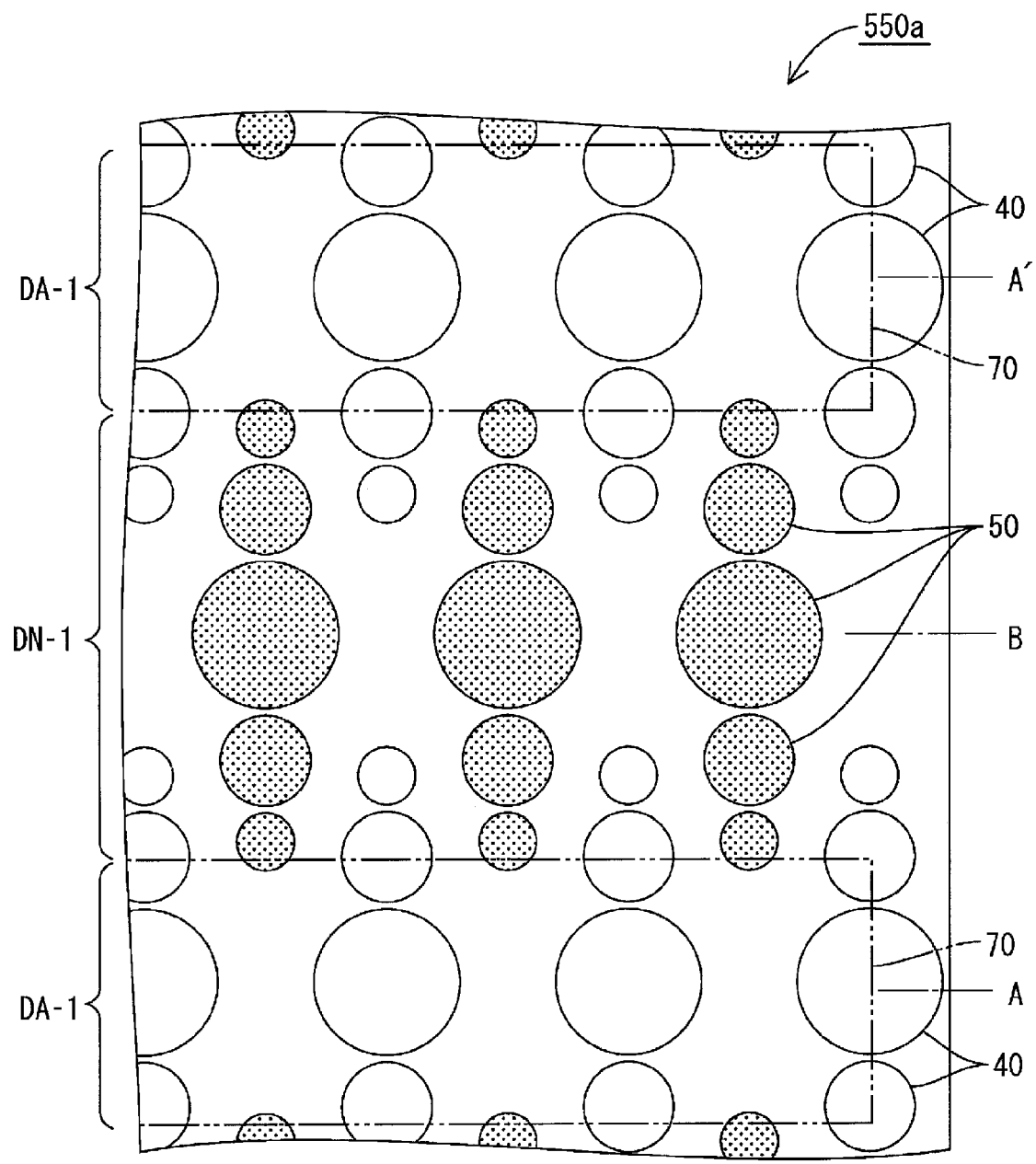
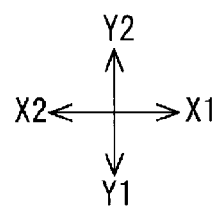

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device does not emit light, and thus a backlight device is required as a separate lighting device. The backlight device is arranged behind the liquid crystal panel (i.e., on a side opposite from a display surface side). It includes a chassis having an opening on a liquid crystal panel side, a plurality of fluorescent tubes (for example, cold cathode tubes) accommodated in the chassis as lamps, and an optical member (a diffuser plate and the like) provided at the opening of the chassis for efficiently directing light emitted from the cold cathode tubes to a liquid crystal panel.

In such a backlight device including cold cathode tubes emitting linear light, the optical member converts linear light into planer light to unify illumination light. However, if the linear light is not sufficiently converted into the planer light, striped lamp images are generated along the arrangement of the cold cathode tubes, and this deteriorates display quality of the liquid crystal display device.

To obtain uniform illumination light from the backlight device, it is desirable to increase the number of cold cathode tubes and reduce a distance between the adjacent cold cathode tubes or to increase a diffusion rate of a diffuser plate, for example. However, increase of the number of cold cathode tubes increases a cost of the backlight device and also increases power consumption. Increase of the diffusion rate of the diffuser plate fails to improve brightness and causes the problem that the number of cold cathode tubes is required to be increased. A backlight device disclosed in Patent Document 1 has been known as one that suppresses power consumption and ensures uniform brightness.

The backlight device described in Patent Document 1 includes a diffuser plate provided on a light output side of a plurality of cold cathode tubes. A dimming dot pattern having a light transmission rate (opening rate) from 62 to 71% and haze from 90 to 99% is printed on the light diffuser plate. A dot diameter of each dot is great directly above the cold cathode tubes and the dot diameter becomes smaller as is farther from the cold cathode tubes. With such a configuration, the light emitted from the cold cathode tubes is efficiently used and the backlight device irradiates light having a sufficient brightness value and uniform brightness without increasing power consumption of the light source.

[Patent Document 1] Japanese Unexamined Patent Publication No. 2005-117023

Problem to be Solved by the Invention

In the device disclosed in Patent Document 1, ink used for forming a dimming dot pattern contains a light blocking material and light blocking materials that provide white are mainly used. White ink has light reflectance with respect to short-wavelength light that is higher than light reflectance with respect to long-wavelength light. Therefore, light (color phase) of short-wavelength is easier to be reflected directly above the cold cathode tubes. This causes the rays of light that have transmitted through the ink to take on a yellow tinge that is a color phase of relatively long-wavelength and illumination light also may be yellow-tinged. In portions far from the cold cathode tubes, rays of light reflected by the dimming dot pattern may be blue-tinged illumination light.

DISCLOSURE OF THE PRESENT INVENTION

The present invention was made in view of the foregoing circumstances. An object of the present invention is to provide a lighting device that provides substantially uniform white illumination light without color unevenness. Another object of the present invention is to provide a display device including such a lighting device and a television receiver including such a display device.

Means for Solving the Problem

To solve the above problem, a lighting device of the present invention includes a light source, a chassis configured to house the light source and have an opening for light from the light source to pass through, and an optical member provided to face the light source and cover the opening. The chassis includes a light source installation area in which the light source is arranged and an empty area in which no light source is arranged. The optical member includes a light source overlapping portion that overlaps the light source installation area and an empty area overlapping portion that overlaps the empty area. A light reflecting portion configured to reflect light from the light source is provided on at least the light source overlapping portion of the optical member such that light reflectance in a surface area of the light source overlapping potion is relatively higher than light reflectance in a surface area of the empty area overlapping portion. A color adjustment portion configured to adjust color of the light source overlapping portion and the empty area overlapping portion is provided on the optical member.

With such a configuration, light output from the light source first reaches the light source overlapping portion of the optical member that is the portion having high light reflectance. Therefore, most of the light reflects off the light source overlapping portion (does not pass through the light source overlapping portion), and the brightness of illumination light is suppressed with respect to the light emission amount from the light source. On the other hand, the light that reflects off the light source overlapping portion is further reflected in the chassis and the light reaches the empty area overlapping portion. The light reflectance of the empty area overlapping portion is relatively low and a larger amount of light passes through the empty area overlapping portion and thus predetermined brightness of illumination light is achieved. This achieves substantially a uniform brightness distribution in the lighting device without arranging a plurality of light sources. The light reflecting portion is provided on the optical member, and therefore, the light of certain color phase may be absorbed (or reflected) by the light reflecting portion. This may cause a part of illumination light to take on a yellow tinge and uniform white light may not be obtained. In the present invention, the color adjustment portion that adjusts color of the light source overlapping portion and the empty portion overlapping portion is formed on the optical member. The color adjustment portion adjusts color of the light source overlapping portion and the empty area overlapping portion to accelerate or suppress absorption of the light of certain color phase. This adjusts color of output light and white illumination light without color unevenness is obtained.

BRIEF DESCRIPTION OF THE DRAWINGS

FIG. 21 is a typical view illustrating an arrangement pattern of a light reflecting portion and a color adjustment portion formed on the diffuser plate;

BEST MODE FOR CARRYING OUT THE INVENTION

First Embodiment

The first embodiment of the present invention will be explained with reference to FIGS. 1 to 10.

First, a construction of a television receiver TV including a liquid crystal display device 10 will be explained.

Figure 1:
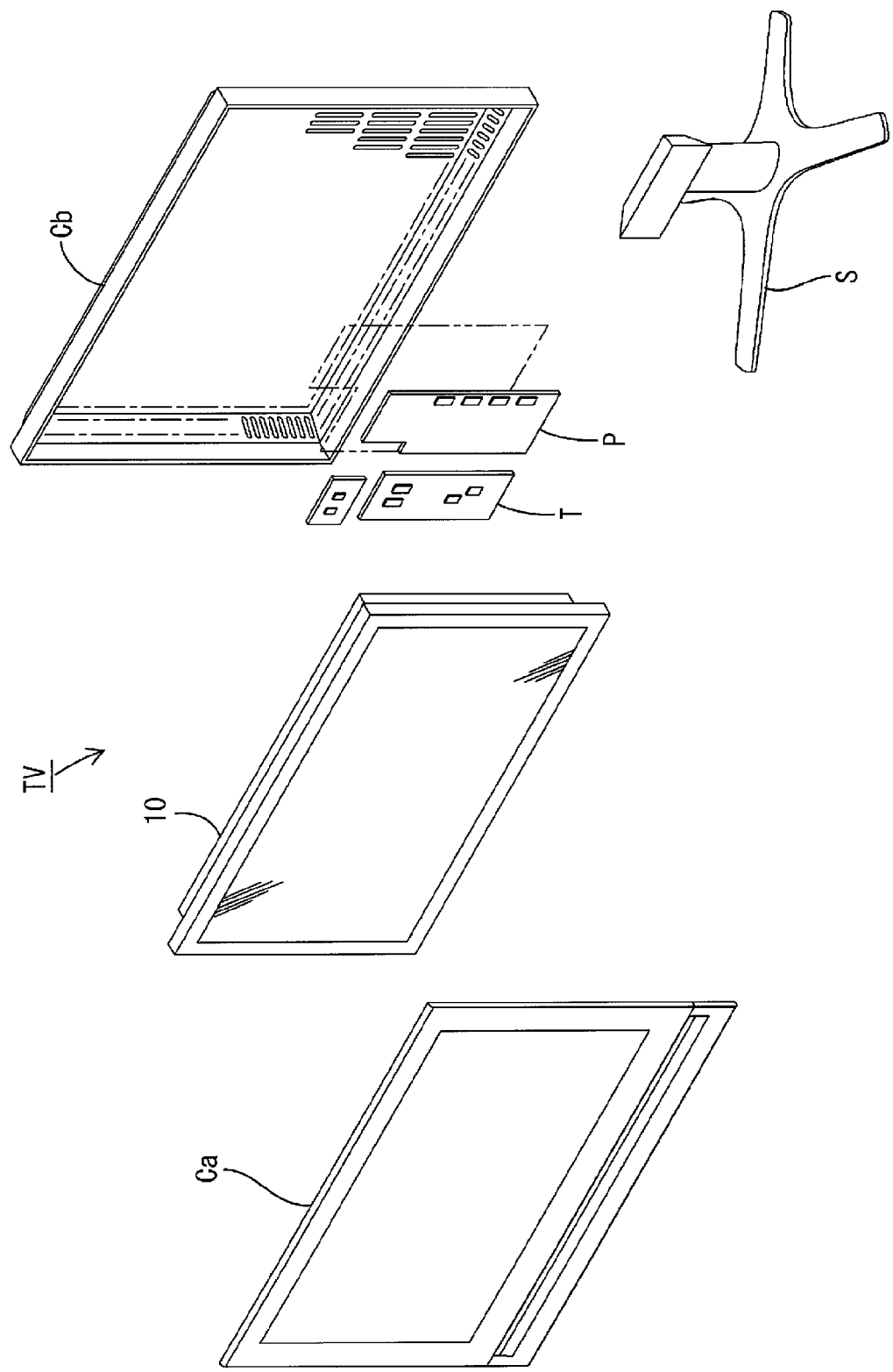
FIG. 1 is an exploded perspective view illustrating a general construction of a television receiver according to a first embodiment of the present invention.
Figure 2:
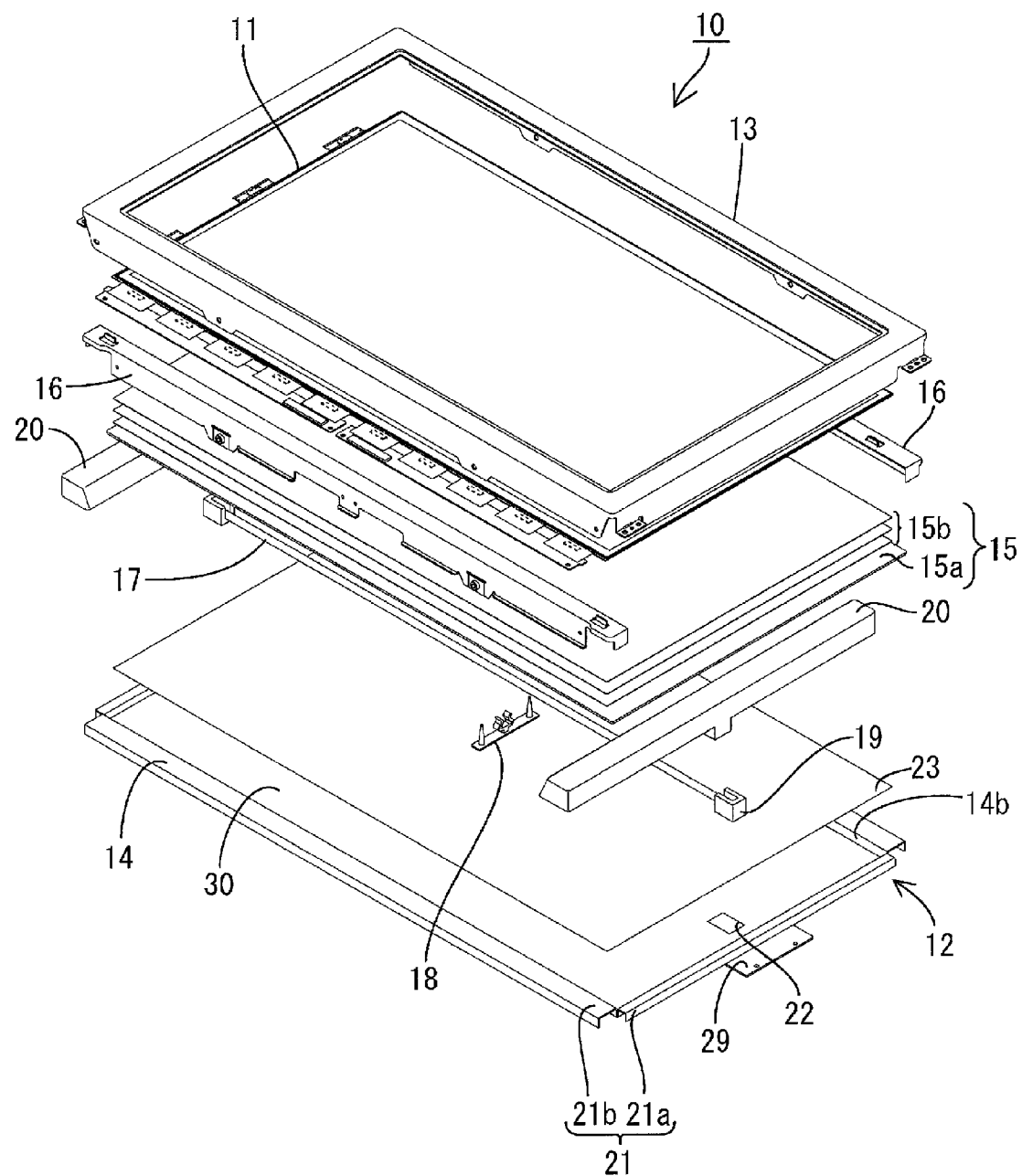
FIG. 2 is an exploded perspective view illustrating a general construction of a liquid crystal display device provided in the television receiver.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position such that a short-side direction thereof matches a vertical line. As illustrated in FIG. 2, it includes a liquid crystal panel 11 as a display panel, and a backlight device 12 (lighting device), which is an external light source. They are integrally held by a frame-like bezel 13 and the like.

Next, the liquid crystal panel 11 and the backlight device 12 included in the liquid crystal display device 10 will be explained (see FIGS. 2 to 4).

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates 11a, 11b are attached to outer surfaces of the substrates (see FIGS. 3 and 4).

As illustrated in FIG. 2, the backlight device 12 includes a chassis 14, an optical sheet set 15 (a diffuser plate (optical member, light diffuser member) 15a and a plurality of optical sheets 15b that are disposed between the diffuser plate 15a and the liquid crystal panel 11), and frames 16. The chassis 14 has a substantially box-shape and an opening 14b on the light output side (on the liquid crystal panel 11 side). The frames 16 arranged along the long sides of the chassis 14 hold the long-side edges of the diffuser plate 15a to the chassis 14. The long-side edges of the light guide plate 15a are sandwiched between the chassis 14 and the frames 16. A hot cathode tube (light source) 17, lamp clips 18, relay connectors 19 and lamp holders 20 are installed in the chassis 14. The lamp clips 18 are provided for mounting the hot cathode tube 17 to the chassis 14. The relay connectors 19 are connected to ends of the hot cathode tube 17 for making electrical connection. The lamp holder 20 collectively covers each end of the hot cathode tube 17 and the relay connector 19. A light output side of the backlight device 12 is a side closer to the diffuser plate 15a than the hot cathode tube 17.

The chassis 14 is prepared by processing a metal plate. It is formed in a substantially shallow box shape. As illustrated in FIGS. 3 and 4, it includes a rectangular bottom plate 30 and outer rims 21, each of which extends upright from the corresponding side of the bottom plate 30 and has a substantially U shape. The outer rims 21 include short-side outer rims 21a and long-side outer rims 21b provided at the short sides and the long sides of the chassis 14, respectively. The bottom plate 30 of the chassis 14 has a plurality of mounting holes 22 along the long-side edges thereof. The relay connectors 19 are mounted in the mounting holes 22. As illustrated in FIG. 3, fixing holes 14c are provided on the upper surface of the chassis 14 along the long-side outer rims 21b to bind the bezel 13, the frames 16 and the chassis 14 together with screws and the like.

A light reflecting sheet 23 is disposed on an inner surface of the bottom plate 30 of the chassis 14 (on a side that faces the hot cathode tube 17). The light reflecting sheet 23 is a synthetic resin sheet having a surface in white color that provides high light reflectivity. The light reflecting sheet 23 is placed so as to cover almost entire inner surface of the bottom plate 30 of the chassis 14. As illustrated in FIG. 4, long-side edges of the light reflecting sheet 23 are lifted so as to cover the long-side outer rims 21b of the chassis 14 and sandwiched between the chassis 14 and the diffuser plate 15a. With this light reflecting sheet 23, light emitted from the hot cathode tubes 17 is reflected to the light guide plate 15a.

Figure 5:
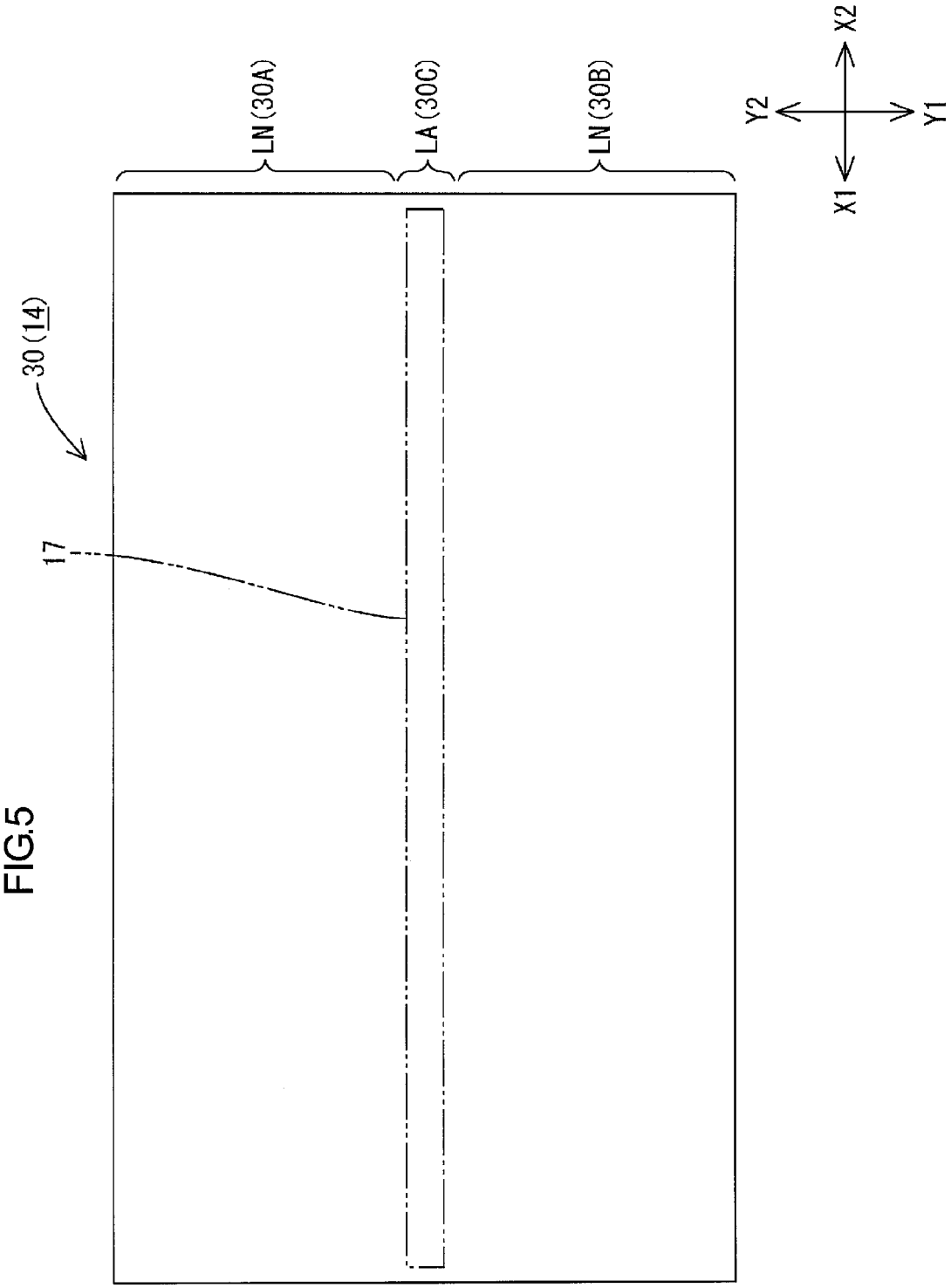
FIG. 5 is a plan view illustrating a general construction of a chassis provided in the liquid crystal display device.

The hot cathode tube 17 is formed in an elongated tubular. The hot cathode tube 17 is arranged in the chassis 14 such that the longitudinal direction (the axial direction) matches the long-side direction of the chassis 14. As illustrated in FIG. 5, the bottom plate 30 of the chassis 14 (the portion facing the diffuser plate 15a) is defined in three portions in the short-side direction of the chassis 14. The three portions include a first end portion 30A, a second end portion 30B that is located on an opposite side end from the first end portion 30A and a middle portion 30C that is sandwiched between the first end portion 30A and the second end portion 30B. The hot cathode tube 17 is arranged in the middle portion 30C of the bottom plate 30 and a light source installation area LA is formed there. No hot cathode tube 17 is arranged in the first end portion 30A and the second end portion 30B of the bottom plate 30 and an empty area LN is formed there. The hot cathode tube 17 is partially arranged in the middle portion of the bottom plate 30 of the chassis 14 to form the light source installation area LA. An area of the light source installation area LA is smaller than that of the empty area LN.

Figure 3:
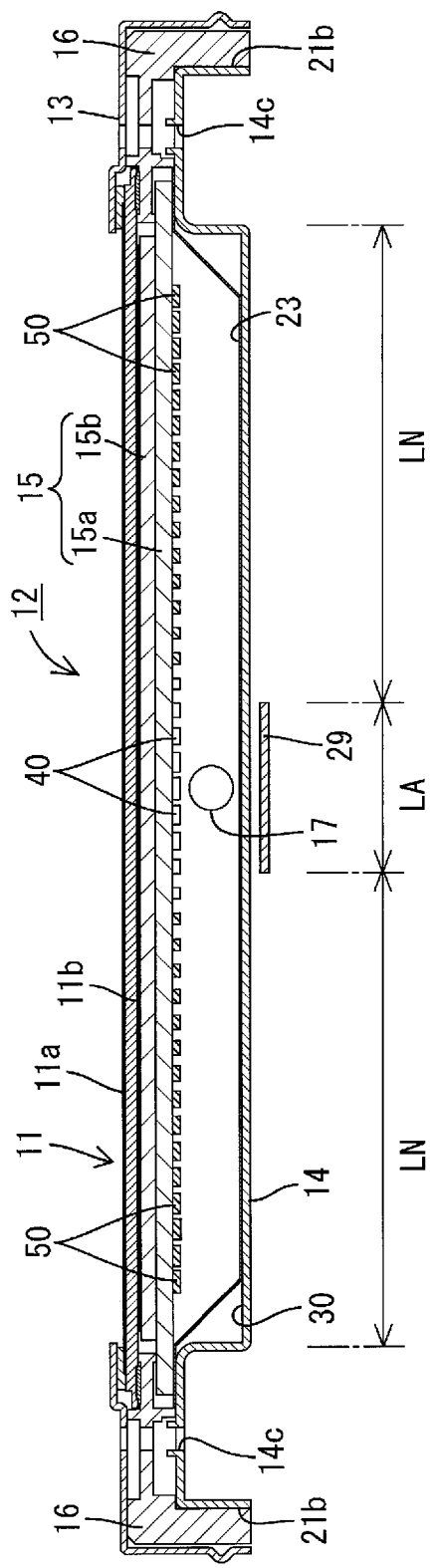
FIG. 3 is a cross-sectional view of the liquid crystal display device along the short-side direction.
Figure 4:
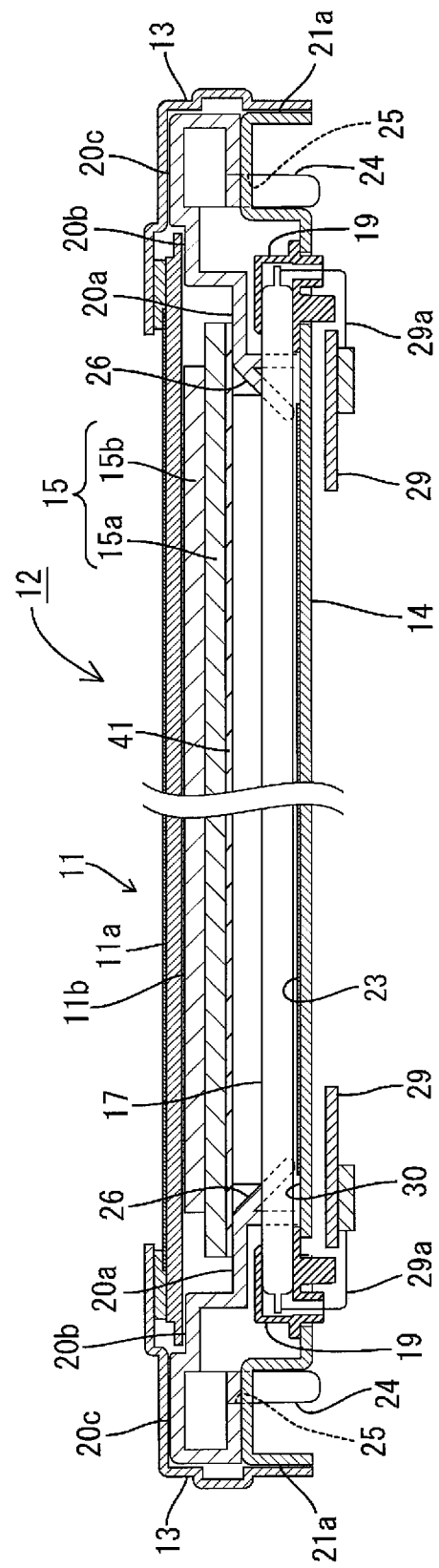
FIG. 4 is a cross-sectional view of the liquid crystal display device along the long-side direction.

On the outer surface of the bottom plate 30 of the chassis 14 (on a side opposite from the hot cathode tube 17), as illustrated in FIGS. 3 and 4, the inverter board set 29 is provided so as to overlap the light source installation area LA, more specifically, to overlap each end of the hot cathode tube 17. Drive power is supplied from the inverter board set 29 to the hot cathode tube 17. Each end of the hot cathode tube 17 has a terminal (not shown) for receiving drive power and electrical connection between the terminal and a harness 29a (see FIG. 4) derived from the inverter board set 29 enables supply of high-voltage drive power. Such electrical connection is established in a relay connector 19 in which the end of the hot cathode tube 17 is fitted. The holders 20 are mounted so as to cover the relay connectors 19.

The holders 20 that cover the ends of the hot cathode tube 17 and the relay connectors 19 are made of white synthetic resin. Each of them has an elongated substantially box shape that extends along the short side of the chassis 14 as illustrated in FIG. 2. As illustrated in FIG. 4, each holder 20 has steps on the front side such that the diffuser plate 15a and the liquid crystal panel 11 are held at different levels. A part of the holder 20 is placed on top of apart of the corresponding short-side outer rim 21a of the chassis 14 and forms a side wall of the backlight device 12 together with the outer rim 21a. An insertion pin 24 projects from a surface of the holder 20 that faces the outer rim 21a of the chassis 14. The holder 20 is mounted to the chassis 14 by inserting the insertion pin 24 into the insertion hole 25 provided in the top surface of the outer rim 21a of the chassis 14.

The steps of the holder 20 that covers the end of the hot cathode tube 17 include three surfaces that are parallel to the bottom plate 30 of the chassis 14. The three surfaces include a first surface 20a, a second surface 20b and a third surface 20c. The short-side rim of the diffuser plate 15a is placed on the first surface 20a that is located at a lowest level. A slanted cover 26 extends from the first surface 20a toward the bottom plate 30 of the chassis 14 with being slanted. A short-side rim of the liquid crystal panel 11 is placed on the second surface 20b of the holder 20. The third surface 20c that is located at a highest level overlaps the outer rim 21a of the chassis 14 and comes in contact with the bezel 13.

On the opening 14b side of the chassis 14, the optical sheet set 15 including the diffuser plate (optical member, light diffusing member) 15a and the optical sheets 15b is provided. The diffuser plate 15a is configured by a plate-like member of synthetic resin and light scattering particles dispersed therein. The diffuser plate 15a diffuses linear light emitted from the hot cathode tube 17 that is a linear light source and also reflects light emitted from the hot cathode tube 17. Each of the short-side rims of the diffuser plate 15a is placed on the first surface 20a of the holder and does not receive a vertical force. Thus, the diffuser plate 15a covers the opening 14b of the chassis 14.

The optical sheets 15b provided on the diffuser plate 15a includes a diffuser sheet, a lens sheet and a reflection-type polarizing plate layered in this order from the diffuser plate 15a side. The optical sheets 15b convert the light that is emitted from the hot cathode tube 17 and passes through the diffuser plate 15a to planar light. The liquid crystal display panel 11 is disposed on the top surface of the top layer of the optical sheets 15b. The optical sheets 15b are held between the diffuser plate 15a and the liquid crystal panel 11.

Figure 7:
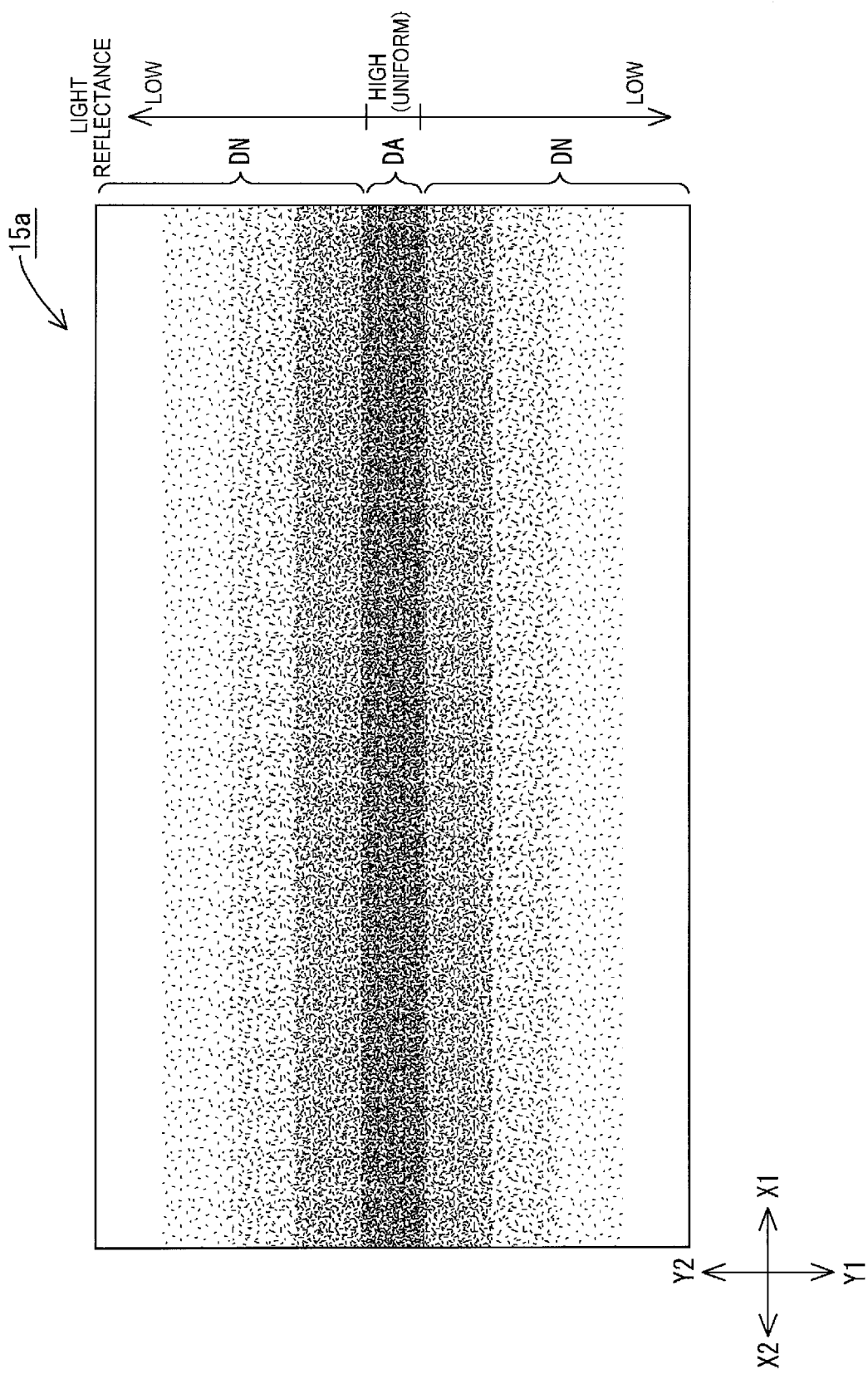
FIG. 7 is a plan view explaining a light reflectance distribution of a surface of the diffuser plate that faces the hot cathode tube.
Figure 8:
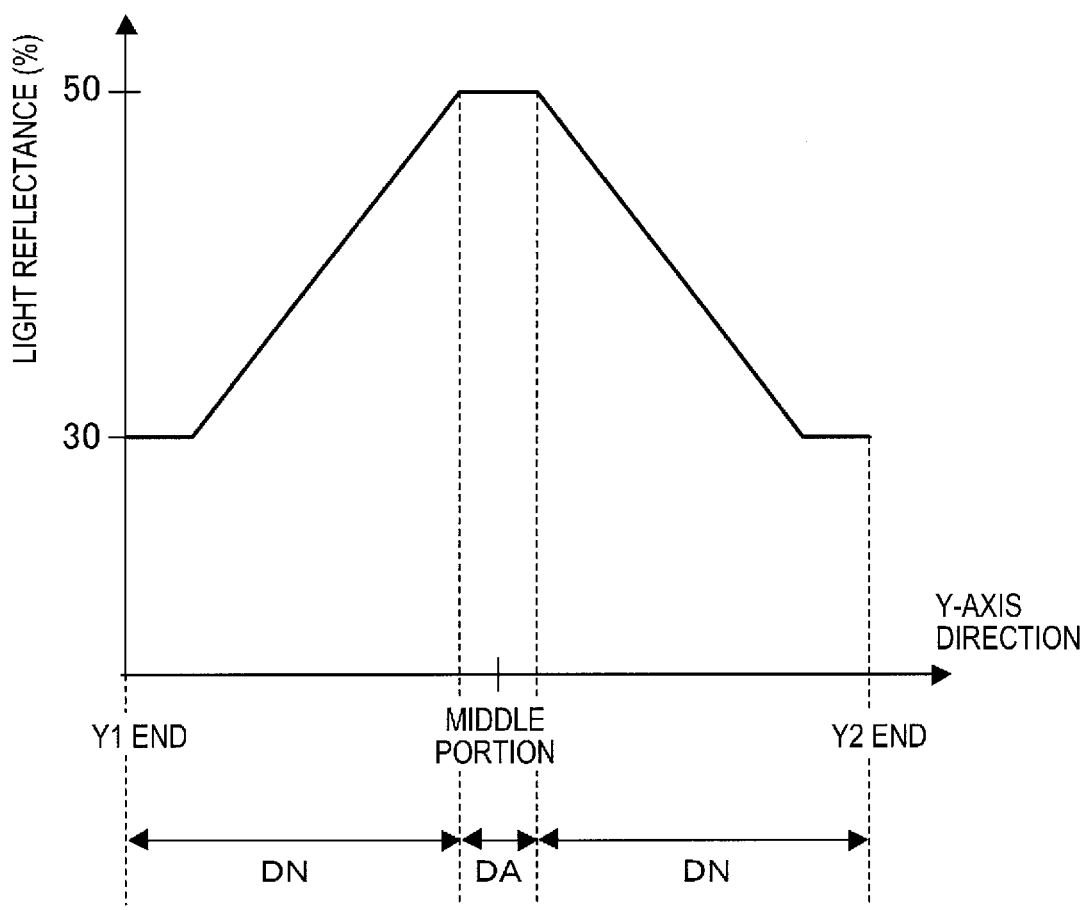
FIG. 8 is a graph illustrating a reflectance change in a short-side direction of the diffuser plate.

A light reflecting function of the diffuser plate 15a will be explained in detail with reference to FIGS. 6 to 8.

Figure 6:
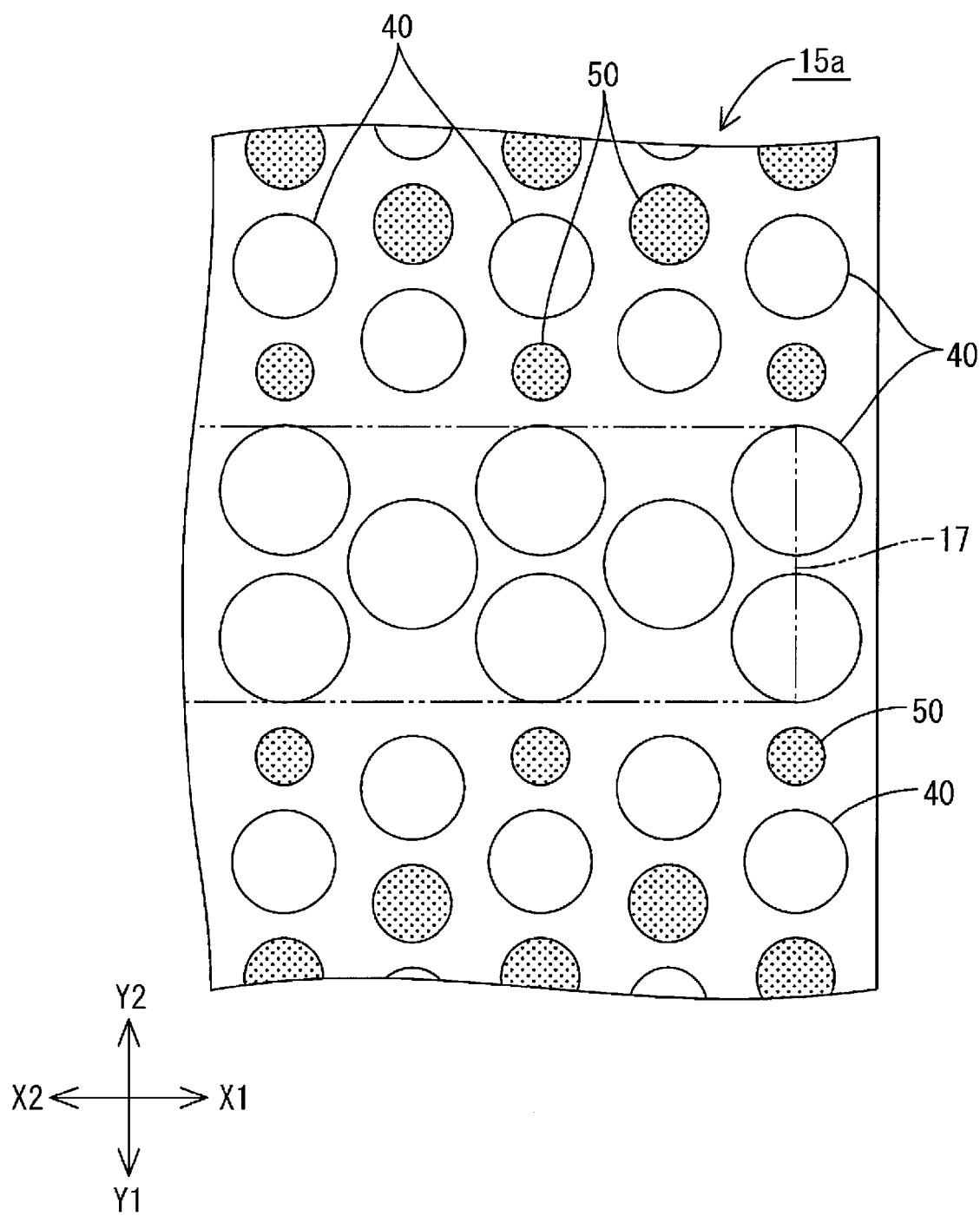
FIG. 6 is a typical view illustrating an arrangement pattern of a light reflecting portion and a color adjustment portion formed on a diffuser plate included in the backlight device.

FIG. 6 is an enlarged plan view illustrating a general construction of the diffuser plate on its surface that faces the hot cathode tube. FIG. 7 is a plan view explaining a light reflectance distribution of a surface of the diffuser plate that faces the hot cathode tube in FIG. 6. FIG. 8 is a graph illustrating a reflectance change in a short-side direction of the diffuser plate in FIG. 6. In FIGS. 6 to 8, the long-side direction of the diffuser plate is referred to as an X-axis direction and the short-side direction thereof is referred to as a Y-axis direction. In FIG. 8, a horizontal axis shows the Y-axis direction (short-side direction) and the light reflectance is plotted on a graph from an end portion close to Y1 (Y1 end) to a middle portion in the Y-axis direction and from the middle portion to an end portion closer to Y2 (Y2 end) in the Y-axis direction.

As illustrated in FIG. 6, a light reflecting portion 40 configured by a white dot pattern is formed on the diffuser plate 15a on a surface opposite from the hot cathode tube 17. In the present embodiment, each dot of the light reflecting portion 40 is formed in a circular shape. The dot pattern forming the light reflecting portion 40 is formed by printing paste containing metal oxide (such as titanium oxide), for example, on the surface of the diffuser plate 15a. Preferable printing means is screen printing, inkjet printing and the like.

The light reflecting portion 40 facing the hot cathode tube 17 has a light reflectance of 80% in its surface area and the diffuser plate 15a facing the hot cathode tube 17 has a light reflectance of 30% in its surface area. Thus, the light reflecting portion 40 has a relatively high light reflectance. In the present embodiment, the light reflectance of each material is represented by an average light reflectance measured with a LAV of CM-3700d (measurement area diameter of 25.4 mm) manufactured by Konica Minolta inside the measurement circle. The light reflectance of the light reflecting portion 40 is measured in the following method. The light reflecting portion 40 is formed over an entire surface of a glass substrate and the light reflectance of the surface is measured according to the above measurement means. The light reflectance of the light reflecting portion 40 is preferably 80% or more, and more preferably 90% or more. Thus, as the light reflectance of the light reflecting portion 40 is higher, the light reflection is controlled more precisely and accurately according to a pattern form of the dot pattern such as the number of dots or the area of each dot.

The diffuser plate 15a has a long-side direction (X-axis direction) and a short-side direction (Y-axis direction). The light reflectance of the surface of the diffuser plate 15a facing the hot cathode tube 17 changes along the short-side direction by changing the dot pattern of the light reflecting portion 40 as illustrated in FIGS. 7 and 8. In other words, on the surface of the diffuser plate 15a facing the hot cathode tube 17, the light reflectance of the portion (referred to as a light source overlapping portion DA) that overlaps the light source installation area LA (a portion in which the hot cathode tube 17 is arranged) is higher than the light reflectance of the portion (referred to as an empty area overlapping portion DN) that overlaps the empty area LN (a portion in which no hot cathode tube 17 is arranged). More specifically, in the light source overlapping portion DA of the diffuser plate 15a, the light reflectance is uniform to be 50% and represents a maximum value on the diffuser plate 15a. On the other hand, in the empty area overlapping surface DN of the diffuser plate 15a, the light reflectance decreases in a continuous and gradual manner from the portion closer to the light source overlapping portion DA toward the portion away from the light source overlapping portion DA. The light reflectance is set to a lowest value that is 30% at two end portions (Y1 end and Y2 end in FIG. 8) of the empty area overlapping portion DN in the short-side direction (Y-axis direction).

A distribution of light reflectance of the diffuser plate 15a is determined by an area of each dot of the light reflecting portion 40. The light reflectance of the light reflecting portion 40 is higher than the light reflectance of the diffuser plate 15a. Therefore, the light reflectance relatively increases by relatively increasing the area occupied by the dots of the light reflecting portion 40 and the light reflectance relatively decreases by relatively decreasing the area occupied by the dots of the light reflecting portion 40. Specifically, in the light source overlapping portion DA of the diffuser plate 15a, the area occupied by the dots of the light reflecting portion 40 is relatively large and uniform. The area occupied by the dots of the light reflecting portion 40 continuously decreases from a border between the light source overlapping portion DA and the empty area overlapping portion DN toward the two end portions of the empty area overlapping portions DN in the short-side direction. As control means for controlling the light reflectance, the area of each dot of the light reflecting portion 40 may be set to be same and a distance between the dots may be changed.

A color adjustment function of the diffuser plate 15a will be explained in detail with reference to FIGS. 9 to 12.

Figure 9:
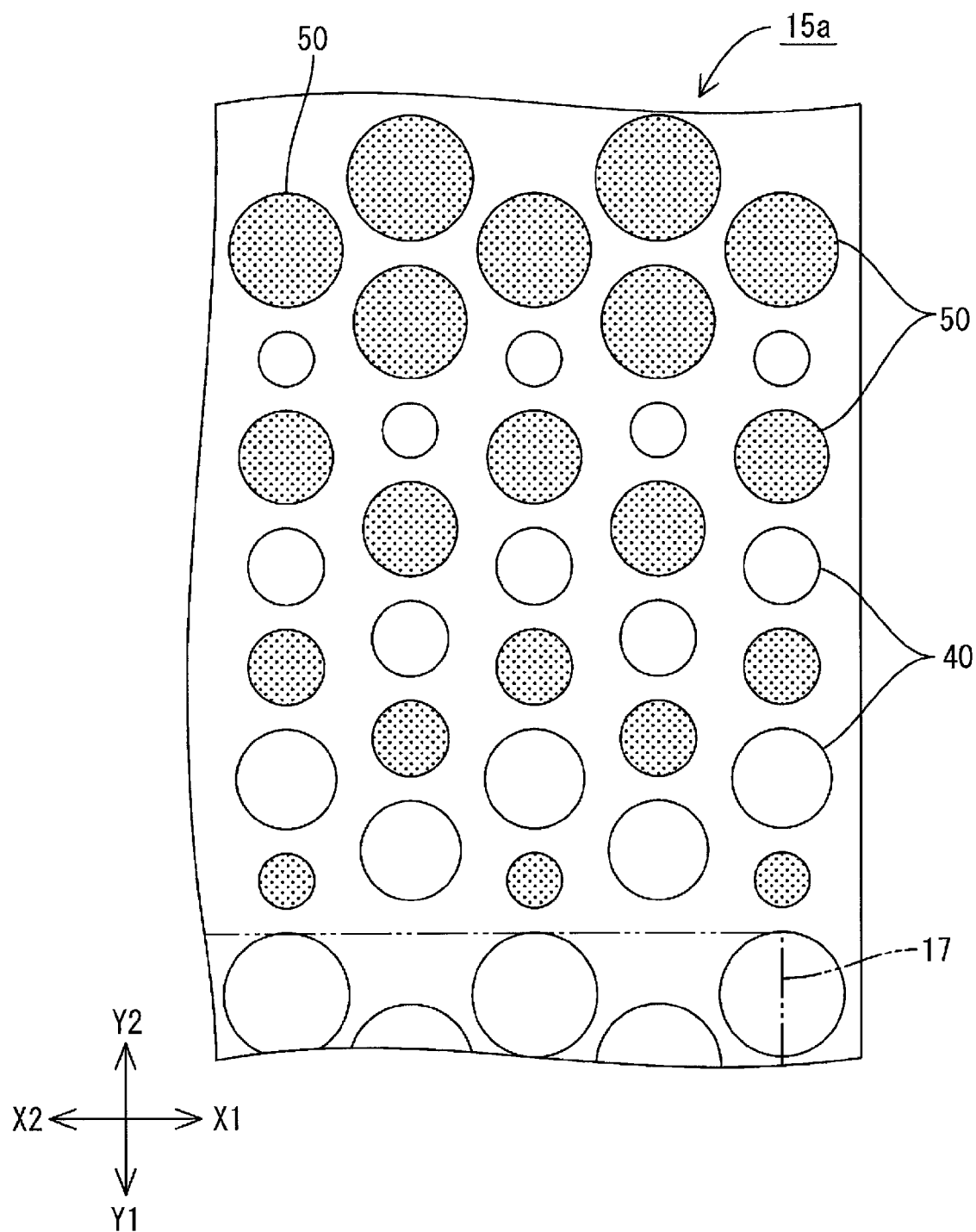
FIG. 9 is a typical view illustrating a plan arrangement pattern of a light reflecting portion and a color adjustment portion formed on the diffuser plate.
Figure 10:
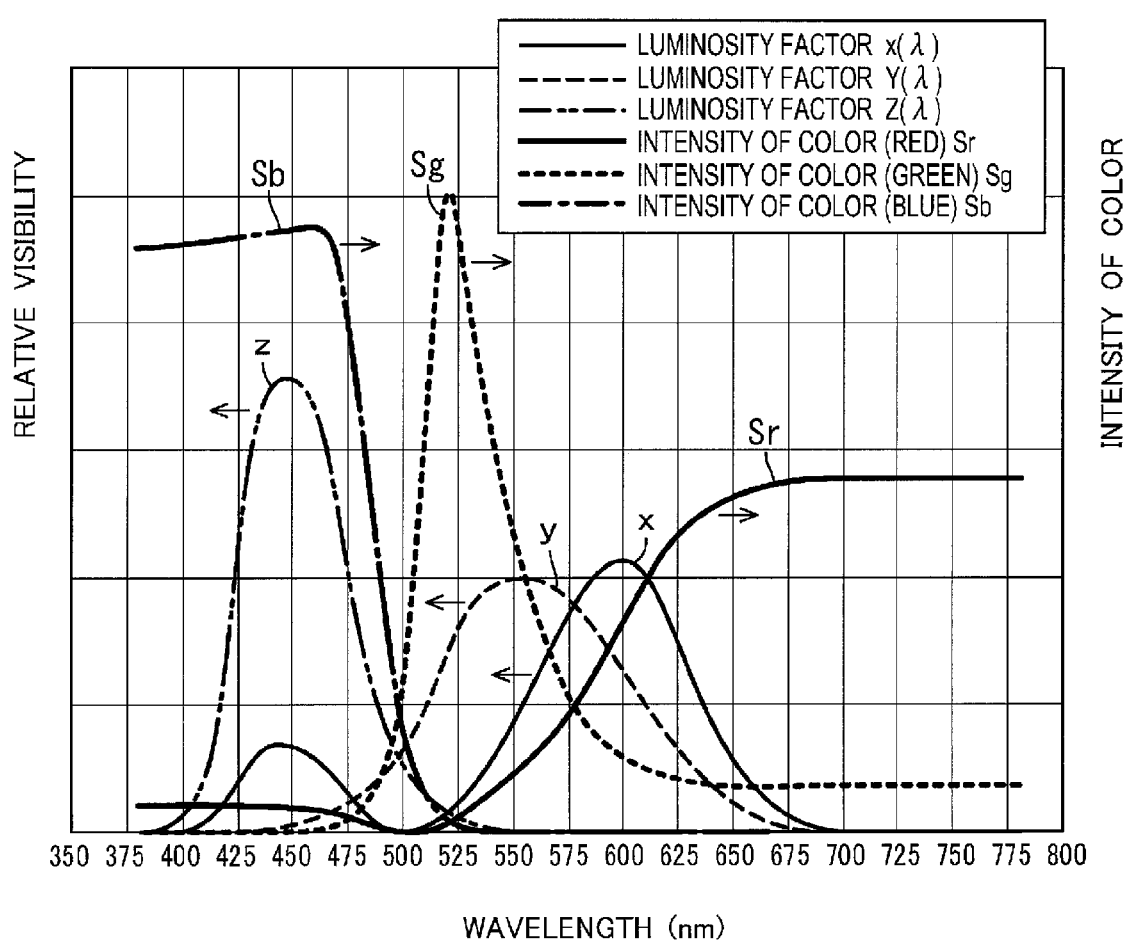
FIG. 10 is a spectral plot of each color.
Figure 11:
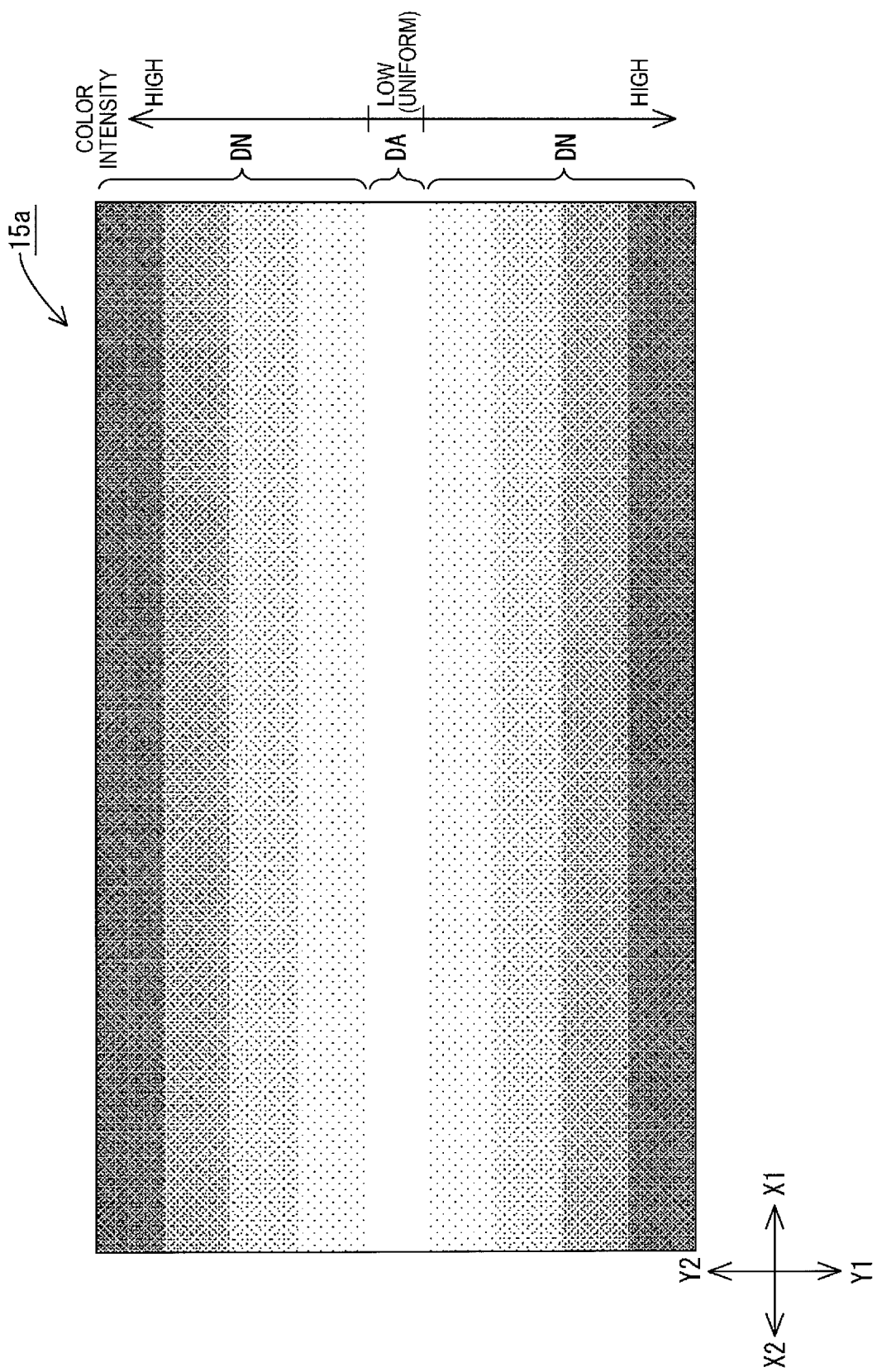
FIG. 11 is a plan view explaining a distribution of color intensity of a surface of the diffuser plate that faces the hot cathode tube.
Figure 12:
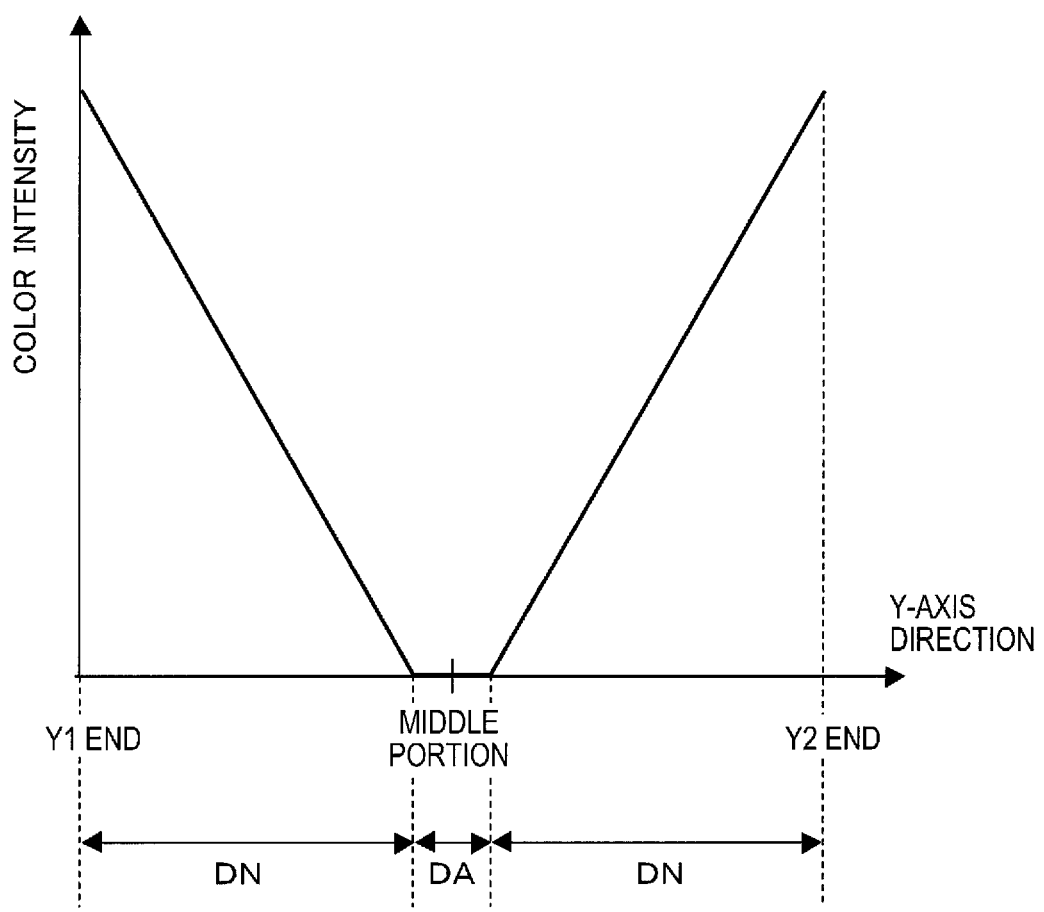
FIG. 12 is a graph illustrating a color intensity change in the short-side direction of the diffuser plate in FIG. 11.

FIG. 9 is an enlarged plan view illustrating a general construction of a surface of the diffuser plate that faces the hot cathode tube. FIG. 10 is a spectral plot of each color. FIG. 11 is a plan view explaining a distribution of color intensity of a surface of the diffuser plate that faces the hot cathode tube. FIG. 12 is a graph illustrating a color intensity change in the short-side direction of the diffuser plate in FIG. 11.

As illustrated in FIG. 9, a color adjustment portion 50 configured by a dot pattern that provides yellow is formed on the diffuser plate 15a on a surface facing the hot cathode tube 17. In the present embodiment, each dot of the color adjustment portion 50 is formed in a circular shape. The dot pattern forming the color adjustment portion 50 is formed by printing phthalocyanine-type yellow pigment, for example, on the surface of the diffuser plate 15a. Preferable printing means is screen printing, inkjet printing and the like. The color adjustment portion 50 may be formed by any pigments or dyes that provide yellow color. Phthalocyanine-type yellow pigment is excellent in durability and preferable for the environment.

Colors of the color adjustment portion 50 will be explained. In FIG. 10, each of x(λ), y(λ) z(λ) represents a color-matching function that is defined in the CIE color system. The color-matching function is also called a visibility function and represents wavelength dependency of three levels of sensitivity that human beings can sense. In FIG. 10, Sr, Sg, Sb represent color intensity curves of red (Sr), green (Sg) and blue (Sb), respectively. Each of the color intensity curves of Sr, Sg, Sb has one of the three levels of sensitivity function that is most dominant. The color intensity curves are obtained by the following formulas (1) to (3).

$$Sr = x(\lambda)/(2*(y(\lambda)+z(\lambda)) \quad \text{Formula (1)}$$

$$Sg = y(\lambda)/(2*(x(\lambda)+z(\lambda)) \quad \text{Formula (2)}$$

$$Sb = z(\lambda)/(2*(x(\lambda)+y(\lambda)) \quad \text{Formula (3)}$$

In the present embodiment, the color of yellow has an absorption band in the light of wavelength shorter than the wavelength of 500 nm that is a crossing point of the color intensity curve of green (Sg) and the color intensity curve of blue (Sb). The color of red has an absorption band in the light of wavelength shorter than the wavelength of 575 nm that is a crossing point of the color intensity curve of green (Sg) and the color intensity curve of red (Sr). In the present embodiment, the color adjustment portion 50 is not limited to be configured by a yellow coloring material but may be configured by a coloring material having an absorption band in the light of relatively short wavelength, and is configured preferably by a coloring material of a color having an absorption band in the light of wavelength shorter than 575 nm. A color phase between yellow and red and having an absorption band in the light of wavelength shorter than 575 nm can be used for the color adjustment portion 50.

On the diffuser plate 15a, the color intensity of the color adjustment portion 50 changes in every area from the empty area overlapping portion DN toward the light source overlapping portion DA. On the diffuser plate 15a, the dot pattern of the color adjustment portion 50 changes so that the color intensity of yellow changes in the short-side direction of the diffuser plate 15a as illustrated in FIGS. 11 and 12. On the diffuser plate 15a, no color adjustment portion 50 is formed on the light source overlapping portion DA and the light source overlapping portion DA has a color of the diffuser plate 15a or a color or the light reflecting portion 40. In the empty area overlapping portion DN, the color intensity of the color adjustment portion 50 increases in a continuous manner from a portion closer to the hot cathode tube 17 (the light source overlapping portion DA) toward a portion away therefrom. The color intensity of the color adjustment portion 50 is greatest in the end portions that are farthest from the hot cathode tube 17 (Y1 end and Y2 end in FIG. 12). Thus, the diffuser plate 15a has relatively greater color intensity in the empty area overlapping portion DN than the light source overlapping portion DA.

The color intensity distribution of the color adjustment portion 50 is determined by an area of each dot of the color adjustment portion 50. An area of each dot of the color adjustment portion 50 is greatest and uniform in the portion of the diffuser plate 15a that is farthest from the light source overlapping portion DA (see FIG. 9). In the empty area overlapping portion DN, an area of each dot of the color adjustment portion 50 decreases in a continuous manner from the end portions of the empty area overlapping portion DN in its short-side direction (Y1 end and Y2 end) toward the border between the light source overlapping portion DA and the empty area overlapping portion DN. As adjusting means for adjusting the color intensity, the area of each dot of the color adjustment portion 50 may be uniform and distances between the dots may be varied.

As explained before, according to the present embodiment, the diffuser plate 15a includes the light source overlapping portion DA that overlaps the light source installation area LA and the empty area overlapping portion DN that overlaps the empty area LN. The light reflecting portion 40 that reflects light from the hot cathode tube 17 is formed on at least the light source overlapping portion DA of the diffuser plate 15a. Accordingly, the light reflectance of the surface area of the light source overlapping portion DA is relatively higher than the light reflectance of the surface area of the empty area overlapping portion DN. Further, the color adjustment portion 50 that adjusts color of the light source overlapping portion DA and the empty area overlapping portion DN is formed on the diffuser plate 15a.

With such a configuration, light output from the hot cathode tube 17 first reaches the light source overlapping portion DA of the diffuser plate 15a that is the portion having light reflecting portion 40 thereon and the relatively high light reflectance. Therefore, most of the light reflects off the light source overlapping portion DA (does not pass through the light source overlapping portion DA), and the brightness of illumination light is suppressed with respect to the light emission amount from the hot cathode tubes 17. On the other hand, the light that reflects off the light source overlapping portion DA is further reflected in the chassis 14 and the light reaches the empty area overlapping portion DN. The light reflectance of the empty area overlapping portion DN is relatively low and a larger amount of light passes through the empty area overlapping portion DN and thus predetermined brightness of illumination light is achieved. This achieves power saving without arranging a plurality of hot cathode tubes 17 and substantially a uniform brightness distribution is achieved in the backlight device 12. The light reflecting portion 40 is provided on the diffuser plate 15a, and therefore, the light of certain color phase may be absorbed (or reflected) by the light reflecting portion 40. This may cause a part of illumination light to take on a blue tinge in a portion away from the hot cathode tube 17 and uniform white light may not be obtained. In the present embodiment, the color adjustment portion 50 that adjusts color of the light source overlapping portion DA and the empty portion overlapping portion DN is formed on the diffuser plate 15a. The color adjustment portion 50 adjusts color of the light source overlapping portion DA and the empty area overlapping portion DN to accelerate or suppress absorption of the light of certain color phase. This adjusts color of output light and white illumination light without color unevenness is obtained.

In the present embodiment, a coloring material that provides yellow color is provided as the color adjustment portion 50 at least on the empty area overlapping portion DN.

With this configuration, the light having a color phase of relatively short wavelength can be absorbed in the empty area overlapping portion DN. Accordingly, even if the light exited from the empty area overlapping portion DN takes on a blue tinge, the light having a blue color phase is absorbed by the color adjustment portion 50 and uniform white light is obtained.

In the present embodiment, the color intensity of yellow changes in every area from the empty area overlapping portion DN toward the light source overlapping portion DA.

The light exited from the diffuser plate 15a may have different color intensity of blue in every area due to difference in distance between every area and the hot cathode tube 17. Even in such a case, with the above configuration, the color intensity of yellow is changed in every area of the diffuser plate 15a by the color adjustment portion 50 and uniform white light is obtained.

In the present embodiment, the color adjustment portion 50 has color intensity of yellow increasing as is farther away from the hot cathode tube 17.

Light emitted from the hot cathode tube 17 and reflected by the light reflecting portion 40 is likely to increase color intensity of blue as is farther away from the hot cathode tube 17. The color adjustment portion 50 has color intensity of yellow increasing as is farther away from the hot cathode tube 17 to absorb the light of a color phase of blue and obtain uniform white light.

In the present embodiment, the color adjustment portion 50 has the greatest color intensity of yellow in the portions farthest away from the hot cathode tube 17.

With this configuration, the color intensity of yellow is greatest in the portion that is easy to take on a blue tinge. This suppresses the illumination light to take on a blue tinge and uniform white light is obtained.

The light reflecting portion 40 is configured by a dot pattern having light reflectivity. The light reflection is controlled by a pattern form (the number (the density) of dots or an area of each dot). Accordingly, uniform illumination brightness can be easily obtained.

In the present embodiment, the light reflecting portion 40 is configured such that the light reflectance decreases in a continuous and gradual manner from the portion having higher light reflectance to the portion having lower light reflectance.

The light reflectance of the light reflecting portion 40 on the diffuser plate 15a decreases in a continuous and gradual manner so as to have a gradation. This makes the distribution of illumination light brightness to be moderate and the lighting device can achieve a uniform distribution of illumination light brightness.

In the present embodiment, the diffuser plate 15a is configured by a light diffusing member that diffuses light from the hot cathode tube 17.

With this configuration, the light transmission of the light source overlapping portion DA and the empty area overlapping portion DN of the diffuser plate 15a is controlled by changing the light reflectance distribution of the light reflecting portion 40, and also the light diffusing member diffuses light. This achieves uniform brightness in the surface area of the backlight device 12.

According to the present embodiment, the chassis 14 is configured such that the portion facing the diffuser plate 15a (the bottom plate 30) is defined in the first end portion 30A, the second end portion 30B and the middle portion 30C that is sandwiched between the first and second end portions 30A and 30B. The second end portion 30B is on the opposite end side from the first end portion 30A. One of the first end portion 30A, the second end portion 30B and the middle portion 30C corresponds to the light source installation area LA and the rest corresponds to the empty areas LN.

With this configuration, compared to a case in which a plurality of hot cathode tubes 17 are installed evenly in the entire chassis 14, the number of hot cathode tubes 17 is reduced and a cost reduction and power saving of the backlight device 12 are achieved.

In the present embodiment, an area of the light source installation area LA is smaller than that of the empty area LN in the chassis 14.

In such a case that the area of the light source installation area LA is smaller than that of the empty area LN, with the configuration of the present embodiment, the light from the hot cathode tube 17 is reflected by the light reflecting portion 40 to be guided to the empty area LN in the chassis 14. This maintains uniform illumination brightness and achieves cost reduction and power saving.

In the present embodiment, the light source installation area LA is provided in the middle portion 30C of the chassis 14.

This ensures sufficient brightness in a middle portion of the backlight device 12 and also ensures brightness in a middle portion of the display in the liquid crystal display device 10 including the backlight device 12 and the liquid crystal display device 10 obtains good visibility.

Modification of First Embodiment

Figure 13:
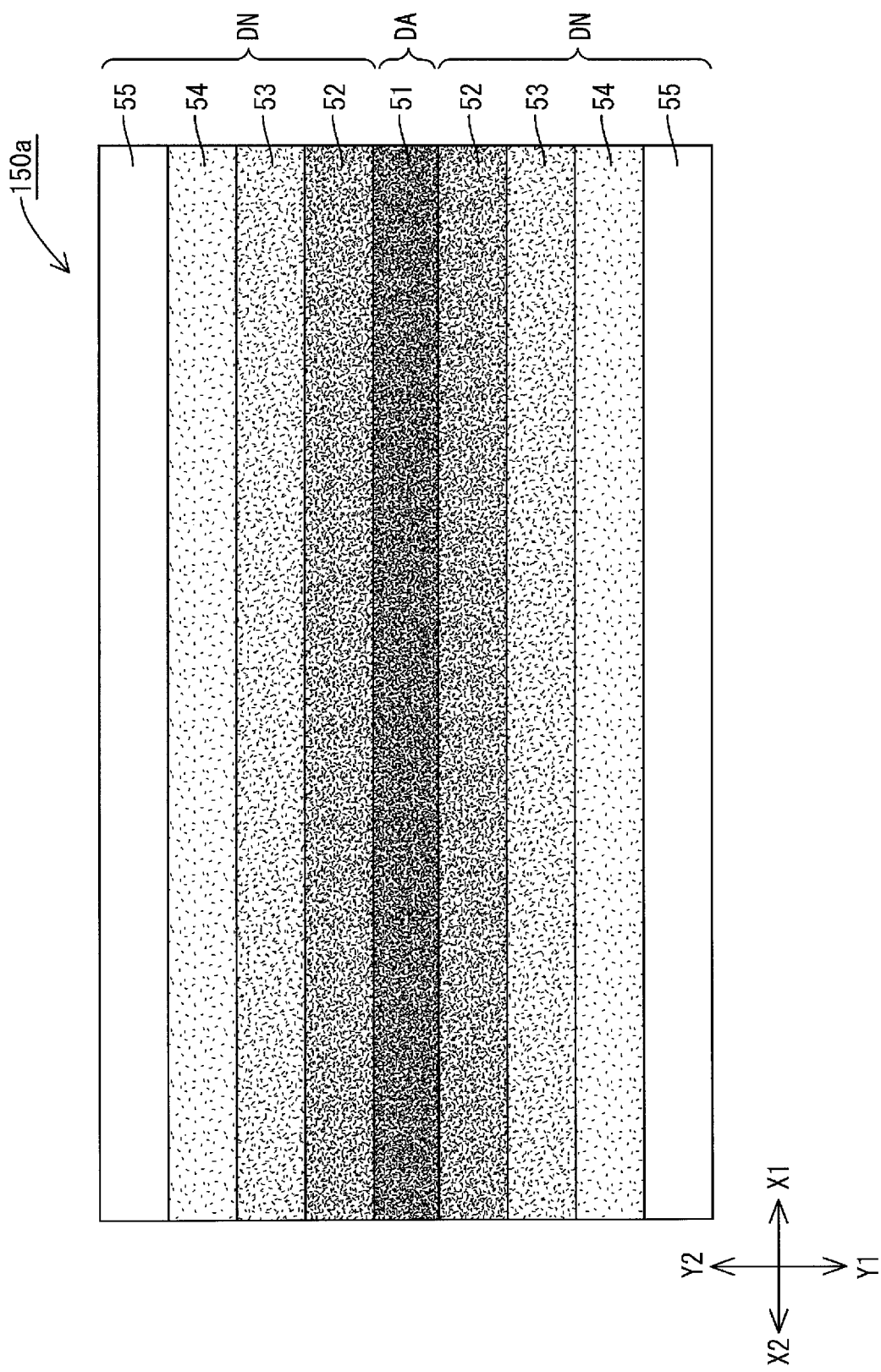
FIG. 13 is a plan view illustrating a light reflectance distribution of a surface of the diffuser plate that faces the hot cathode tube according to one modification.
Figure 14:
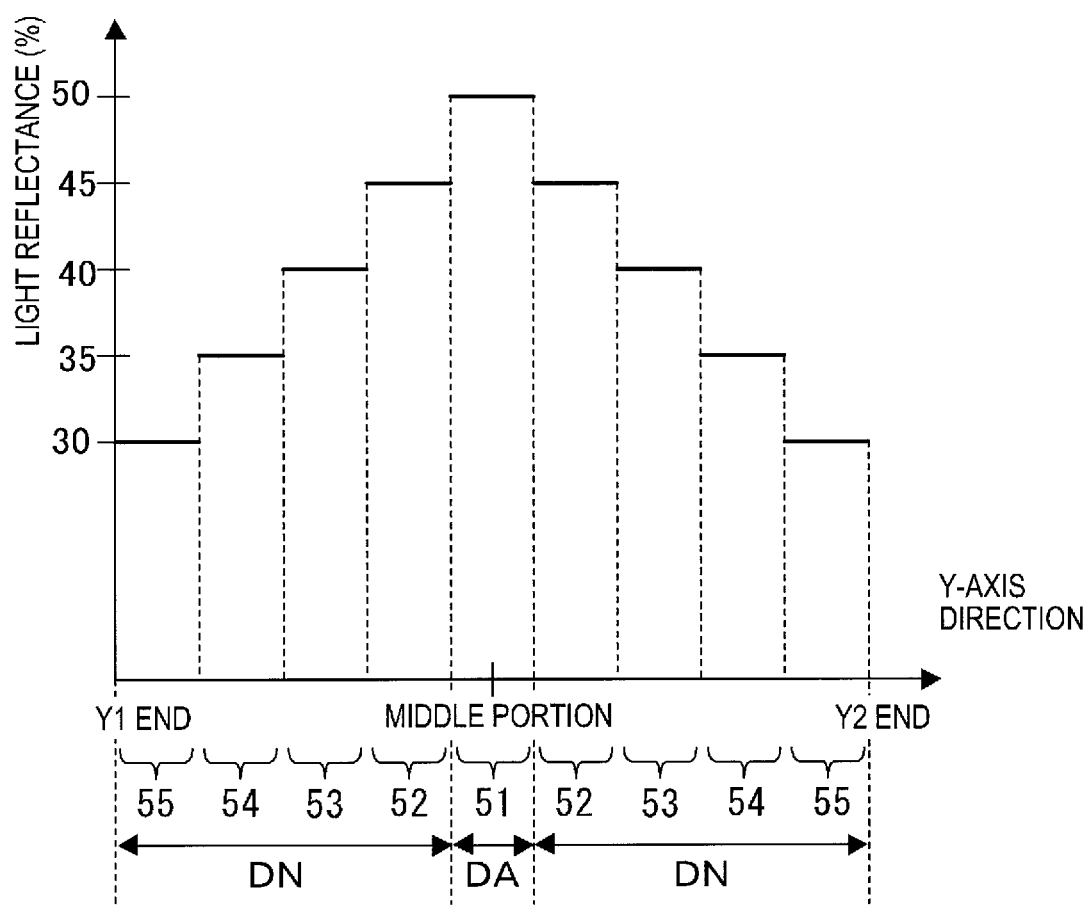
FIG. 14 is a graph illustrating a light reflectance change in the short-side direction of the diffuser plate in FIG. 13.

The present invention is not limited to the first embodiment, and may include a following modification. The light reflectance distribution of the diffuser plate 15a may be modified as illustrated in FIGS. 13 and 14. FIG. 13 is a plan view illustrating a light reflectance distribution of a surface of the diffuser plate that faces the hot cathode tube according to one modification. FIG. 14 is a graph illustrating a light reflectance change in the short-side direction of the diffuser plate in FIG. 13. In the following modification, the same components and parts as the first embodiment are indicated by the same symbols and will not be explained.

As illustrated in FIGS. 13 and 14, the light source overlapping portion DA of a diffuser plate 150a (a surface of the portion that overlaps the light source installation area LA facing the hot cathode tube 17) has the highest light reflectance, and in the empty area overlapping portion DN of the diffuser plate 150a (a surface of the portion that overlaps the empty area LN facing the hot cathode tube 17), the light reflectance decreases in a stepwise and gradual manner from the portion closer to the light source overlapping portion DA toward the portion farther therefrom. Namely, in the empty area overlapping portion DN of the diffuser plate 150a, the light reflectance changes step by step along the short-side direction (Y-axis direction) of the diffuser plate 150a. More specifically, as illustrated in FIG. 13, a first area 51 having relatively high light reflectance is provided in the light source overlapping portion DA that is located in the middle portion of the diffuser plate 150a, and second areas 52, 52 having light reflectance relatively lower than the first area 51 are provided next to the first area 51 in the empty area overlapping portion DN located at the sides of the first area 51. Further, in the empty area overlapping portion DN, third areas 53, 53 having light reflectance relatively lower than the second areas 52 are provided at the sides of the second areas 52, fourth areas 54, 54 having light reflectance lower than the third areas 53 are provided at the sides of the third areas 53, and fifth areas 55, 55 having light reflectance lower than the fourth areas 54 are provided at the sides of the fourth areas 54.

In this modification, as illustrated in FIG. 14, the light reflectance of the diffuser plate 150a is 50% in the first area, 45% in the second area, 40% in the third area, 35% in the fourth area, and 30% in the fifth area and it changes with equal ratio. In the first to fourth areas, the area occupied by the dots of the light reflecting portion 40 is changed to determine the above light reflectance, and the light reflectance in the fifth area in which no light reflecting portion 40 is provided is represented by the light reflectance of the diffuser plate 150a.

A plurality of areas 52, 53, 54, 55 having different light reflectance are defined in the empty area overlapping portion DN of the diffuser plate 150a. The light reflectance is reduced from the second area 52 to the fifth area 55 sequentially in this order such that the light reflectance decreases in a stepwise manner from the portion closer to the light source overlapping portion DA toward the portion farther therefrom.

According to such a configuration, the brightness distribution of illumination light in the empty area overlapping portion DN (empty area LN) is made moderate and the backlight device 12 can obtain a moderate illumination brightness distribution. With the means for forming a plurality of areas 52, 53, 54, 55 having different light reflectance, a manufacturing method of the diffuser plate 150a becomes simple and this contributes to a cost reduction.

Second Embodiment

Figure 16:
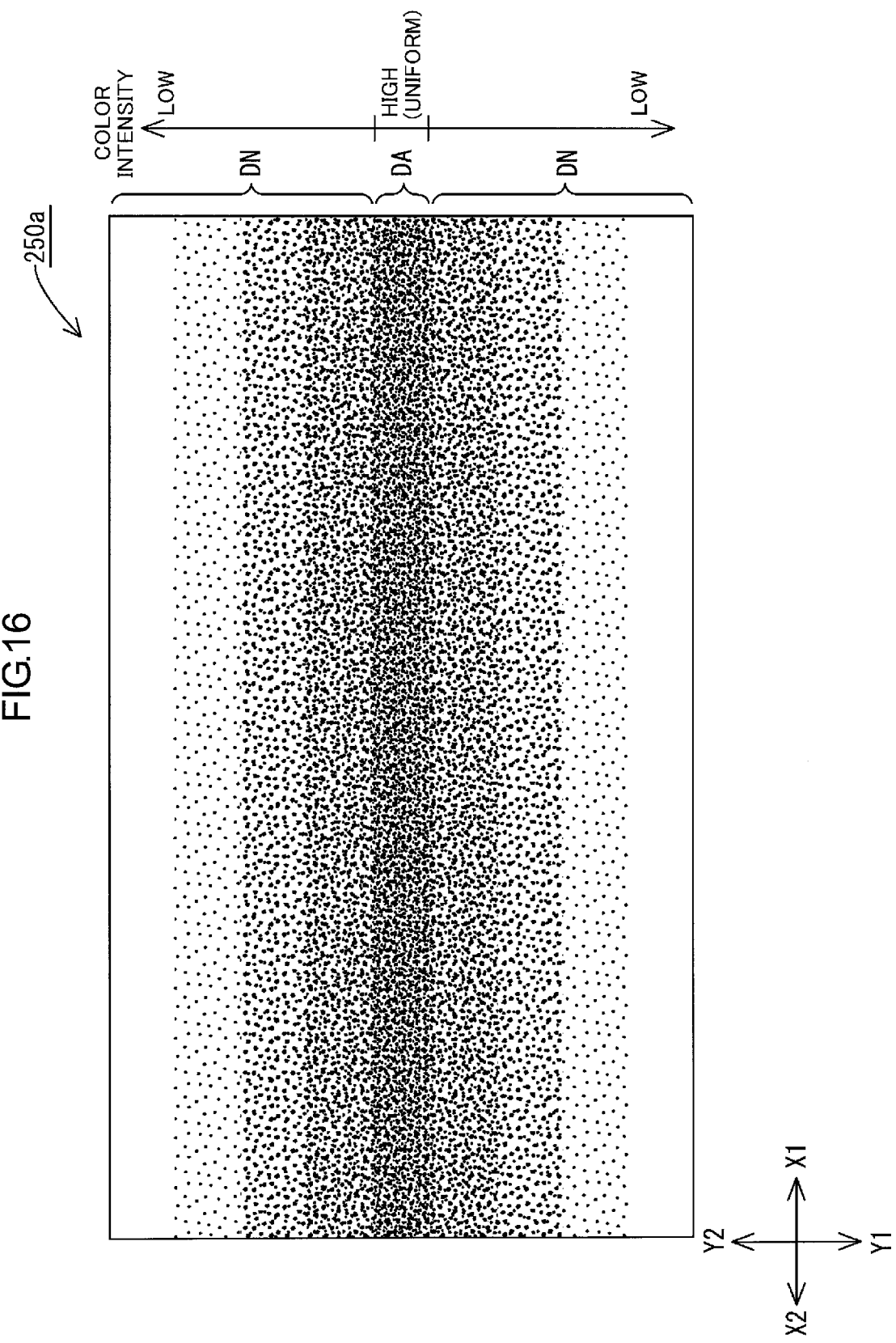
FIG. 16 is a plan view explaining a color intensity distribution of a surface of the diffuser plate that faces the hot cathode tube.
Figure 17:
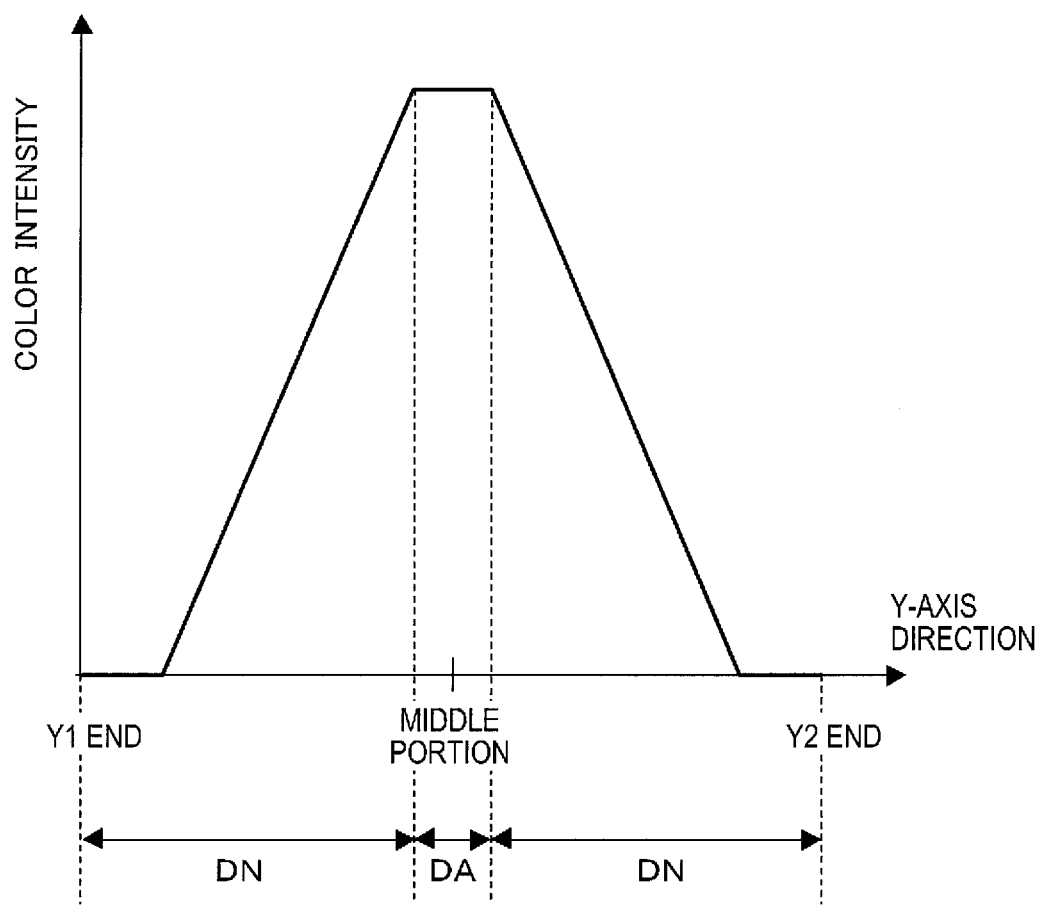
FIG. 17 is a graph illustrating a color intensity change in the short-side direction of the diffuser plate in FIG. 16.

Next, a second embodiment of the present invention will be explained with reference to FIGS. 15 to 17. In the second embodiment, a pattern form of the color adjustment portion is altered from the first embodiment and other configuration is similar to the first embodiment. In the second embodiment, the same components and parts as the first embodiment are indicated by the same symbols and will not be explained.

Figure 15:
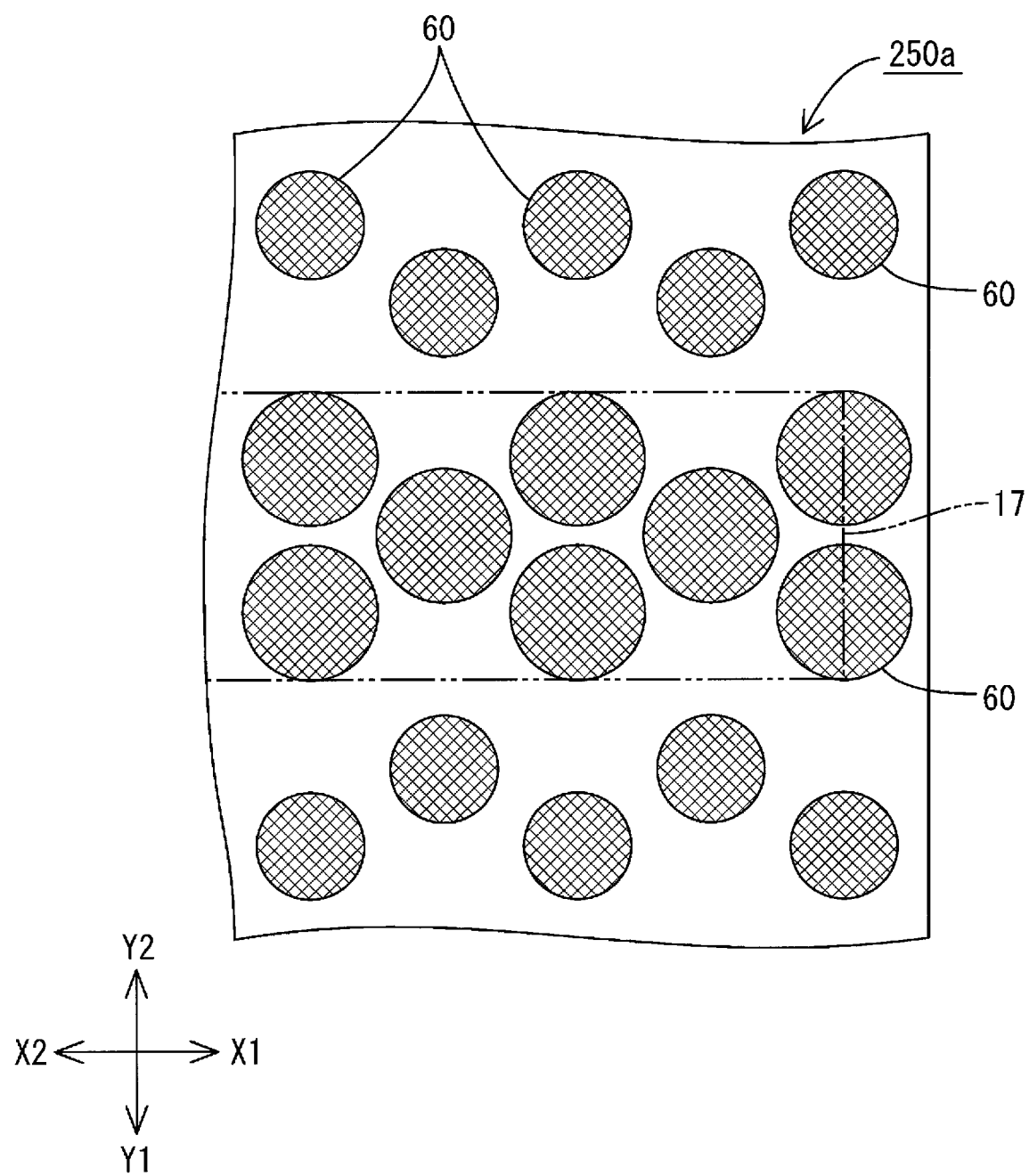
FIG. 15 is a typical view illustrating a plan arrangement pattern of a light reflecting portion and a color adjustment portion formed on a diffuser plate included in a backlight device according to a second embodiment of the present invention.

FIG. 15 is an enlarged plan view illustrating a general configuration of a surface of a diffuser plate that faces the hot cathode tube. FIG. 16 is a plan view explaining a color intensity distribution of a surface of the diffuser plate that faces the hot cathode tube. FIG. 17 is a graph illustrating a color intensity change in the short-side direction of the diffuser plate in FIG. 16.

As illustrated in FIG. 15, a dot pattern configured by circular dots is formed on a surface of a diffuser plate 250a that faces the hot cathode tube 17. Each dot is formed by printing on a surface of the diffuser plate 250a a paste containing metal oxide (such as titanium oxide) having light reflectivity and also containing phthalocyanine-type cyan pigment. Therefore, each dot functions as the light reflecting portion 40 and also functions as a color adjustment portion 60. In other words, the light reflecting portion 40 and the color adjustment portion 60 are formed in a same layer. The color adjustment portion 60 may be formed by any pigments or dyes that provide cyan color. Phthalocyanine-type cyan pigment is excellent in durability and preferable for the environment.

In the present embodiment, a color of cyan has an absorption band in the light of wavelength longer than the wavelength of 575 nm that is a crossing point of a color intensity curve of green (Sg) and a color intensity curve of red (Sr). A color of blue has an absorption band in the light of wavelength longer than the wavelength of 500 nm that is a crossing point of a color intensity curve of green (Sg) and a color intensity curve of blue (Sb). In the present embodiment, the color adjustment portion 60 is not limited to be configured by a cyan coloring material but may be configured by a coloring material having an absorption band in the light of relatively long wavelength, and is configured preferably by a color having an absorption band in the light of wavelength longer than 500 nm. A color phase between cyan and blue and having an absorption band in the light of wavelength longer than 500 nm can be used for the color adjustment portion 60.

On the diffuser plate 250*a*, the color intensity of the color adjustment portion 60 changes in every area from the light source overlapping portion DA toward the empty area overlapping portion DN. On the diffuser plate 250*a*, the dot pattern of the color adjustment portion 60 changes so that the color intensity of cyan changes in the short-side direction of the diffuser plate 250*a* as illustrated in FIGS. 16 and 17. The color intensity of the color adjustment portion 60 is greatest in the light source overlapping portion DA of the diffuser plate 250*a*, and the color intensity of the color adjustment portion 60 decreases in a continuous manner in the empty area overlapping portion DN from a portion closer to the light source overlapping portion DA toward a portion farther therefrom. No color adjustment portion 60 is formed on the end portions of the empty area overlapping portion DN (Y1 end and Y2 end in FIG. 17) and the end portions has color of the diffuser plate 250*a*. Thus, the diffuser plate 250*a* has relatively greater color intensity in the light source overlapping portion DA than the empty area overlapping portion DN.

The color intensity distribution of the color adjustment portion 60 is determined by an area of each dot of the color adjustment portion 60. An area of each dot of the color adjustment portion 60 is relatively great and uniform in the light source overlapping portion DA (see FIG. 15). In the empty area overlapping portion DN, an area of each dot of the color adjustment portion 60 decreases in a continuous manner from the border between the empty area overlapping portion DN and the light source overlapping portion DA toward the end portions of the empty area overlapping portion DN (Y1 end and Y2 end). As adjusting means for adjusting the color intensity, the area of each dot of the color adjustment portion 60 may be uniform and distances between the dots may be varied.

As is explained before, in the present embodiment, a coloring material that provides cyan is provided as the color adjustment portion 60 at least on the light source overlapping portion DA of the diffuser plate 250*a*.

With this configuration, the light having a color phase of relatively long wavelength can be absorbed in the light source overlapping portion DA. Accordingly, even if the light exited from the light source overlapping portion DA takes on a yellow tinge, the light having a yellow color phase is absorbed by the color adjustment portion 60 and uniform white light is obtained.

In the present embodiment, the color intensity of cyan changes in every area from the light source overlapping portion DA toward the empty area overlapping portion DN.

The light exited from the diffuser plate 250*a* may have different color intensity of yellow in every area due to difference in distance between every area and the hot cathode tube 17. Even in such a case, with the above configuration, the color intensity of cyan is changed by the color adjustment portion 60 in every area of the diffuser plate 15*a* and uniform white light is obtained.

In the present embodiment, the color adjustment portion 60 and the light reflecting portion 40 form one layer. Therefore, separate forming processes for forming the color adjustment portion 60 and the light reflecting potion 40 are not necessary. This improves working efficiency.

Modification of Second Embodiment

Figure 18:
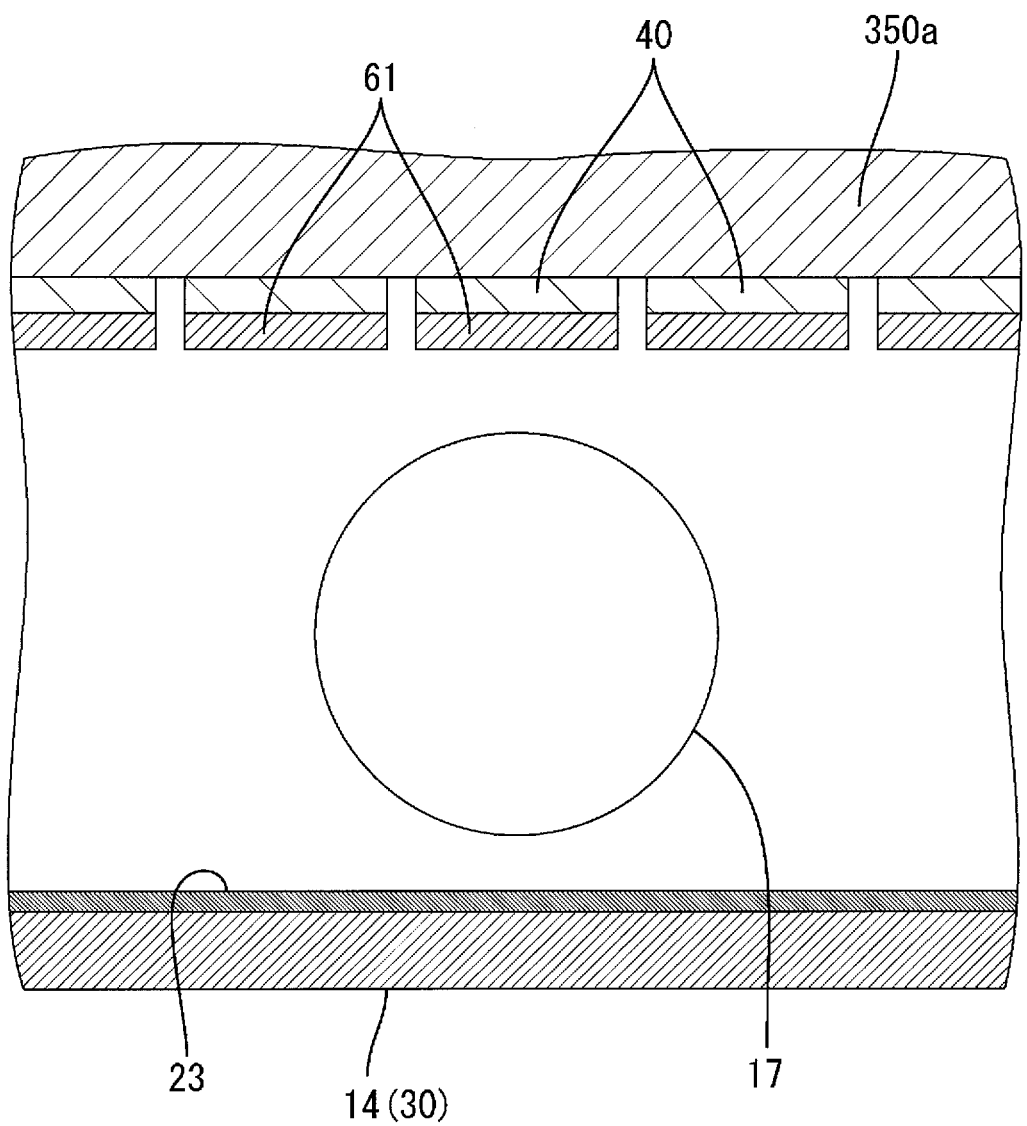
FIG. 18 is an enlarged cross-sectional view illustrating a main portion of the diffuser plate according to one modification in which a formation pattern of a color adjustment portion is modified.

The present invention is not limited to the second embodiment, and may include a following modification. The color adjustment portion 60 of the diffuser plate 250*a* may be formed as illustrated in FIG. 18. FIG. 18 is an enlarged cross-sectional view of a diffuser plate illustrating a forming pattern of a color adjustment portion.

In this modification, the light reflecting portion 40 is formed on a diffuser plate 350*a* on a surface facing the hot cathode tube 17, and a color adjustment portion 61 that provides cyan color is formed on a surface of the light reflecting portion 40 (a surface facing the hot cathode tube 17). That is, the color adjustment portion 61 is layered on the light reflecting portion 40. Such a layered configuration is achieved by printing the light reflecting portion 40 on the surface of the diffuser plate 350*a* first and printing the color adjustment portion 61 on the surface of the light reflecting portion 40. Thus, the color adjustment portion 61 may be formed to be layered on the light reflecting portion 40.

Third Embodiment

Next, a third embodiment of the present invention will be explained with reference to FIG. 19. In the third embodiment, a pattern form of the color adjustment portion is altered from the first embodiment and other configuration is similar to the first embodiment. In the third embodiment, the same components and parts as the first embodiment are indicated by the same symbols and will not be explained.

Figure 19:
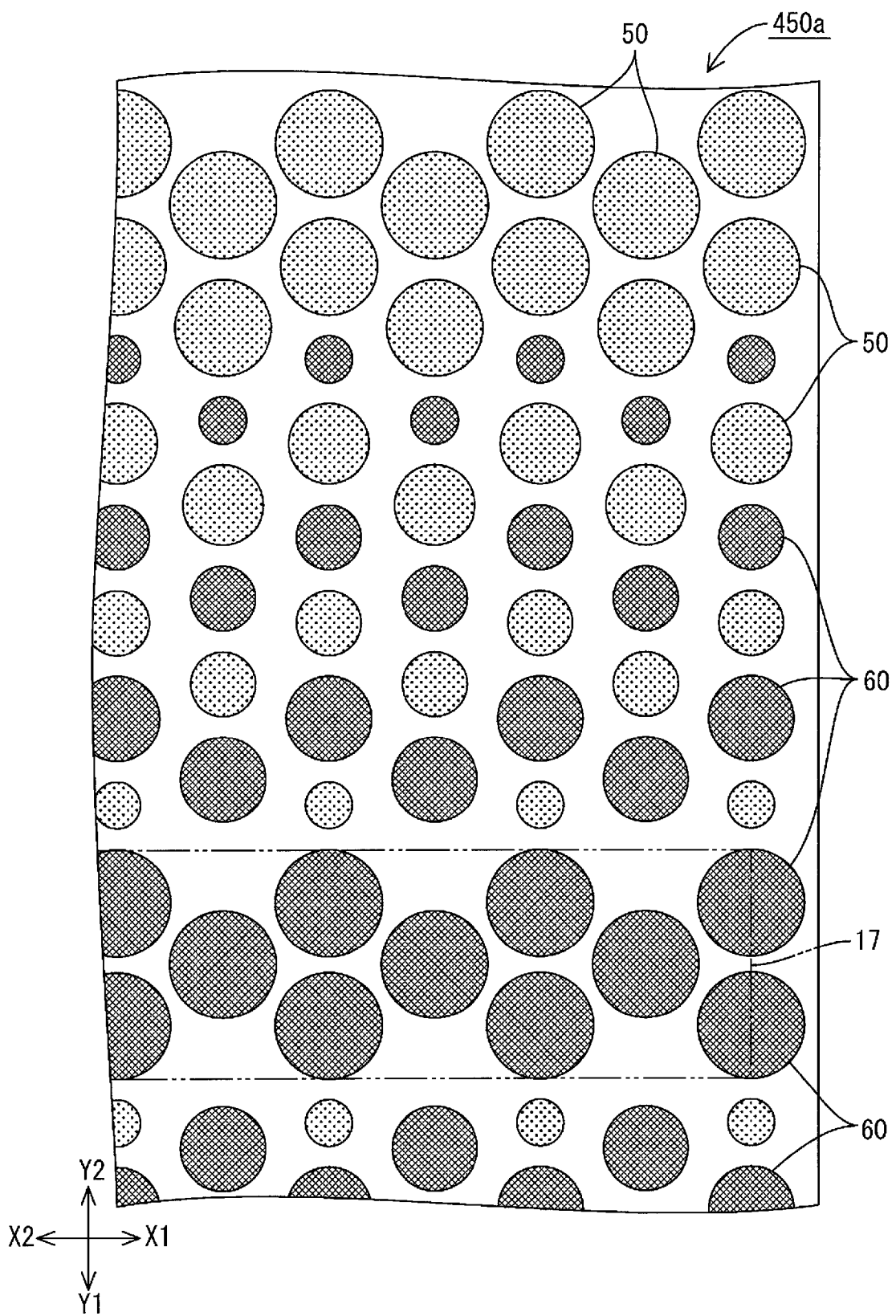
FIG. 19 is a typical view illustrating an arrangement pattern of a light reflecting portion and a color adjustment portion that are formed on a diffuser plate included in a backlight device according to a third embodiment of the present invention.

FIG. 19 is an enlarged plan view illustrating a general construction of a surface of the diffuser plate that faces the hot cathode tube.

As illustrated in FIG. 19, two kinds of dot patterns are formed on a surface of a diffuser plate 450*a* that faces the hot cathode tube 17. One of the dot patterns is formed by printing on a surface of the diffuser plate 450*a* a paste containing metal oxide (such as titanium oxide) having light reflectivity and also containing phthalocyanine-type cyan pigment. Therefore, each of the dots included in the dot pattern functions as the light reflecting portion 40 and also functions as the color adjustment portion 60 that provides cyan color. An area of each dot of the color adjustment portion 60 is greatest in the light source overlapping portion DA. In the empty area overlapping portion DN, an area of each dot of the color adjustment portion 60 decreases in a continuous manner from a portion closer to the light source overlapping portion DA toward a portion farther therefrom. Therefore, the cyan color intensity of the diffuser plate 450*a* is greatest in the light source overlapping portion DA, and the cyan color intensity decreases in the empty area overlapping portion DN toward a portion farther from the light source overlapping portion DA.

The other one of the dot patterns configures a color adjustment portion 50 that is formed by printing phthalocyanine-type yellow pigment on the empty area overlapping portion DN of the diffuser plate 450*a*. An area of each dot of the color adjustment portion 50 is greatest at the end portions of the empty area overlapping portion DN in its short-side direction (Y1 end and Y2 end) and decreases in a continuous manner as is closer to the light source overlapping portion DA. Therefore, the yellow color intensity of the diffuser plate 450a is greatest at the end portions in the empty area overlapping portion DN (Y1 end and Y2 end) that are farthest from the light source overlapping portion DA and decreases as is closer to the light source overlapping portion DA.

With the above configuration, the color adjustment portion 50 that provides yellow and the color adjustment portion 60 that provides cyan are combined to adjust color precisely in every area on the diffuser plate 450a. In the portion of the diffuser plate 450a having the light reflecting portion 40 thereon (the light source overlapping portion DA), the illumination light is easy to take on yellow tinge. Therefore, the color adjustment portion 60 that provides cyan is formed on the light source overlapping portion DA to absorb the light of a color phase having relatively long wavelength and obtain uniform white light. In the empty area overlapping portion DN, the illumination light is easy to take on a blue tinge as is farther from the hot cathode tube 17. Therefore, the color adjustment portion 50 that provides yellow is formed on the empty area overlapping portion DN to absorb the light of a color phase having relatively short wavelength and obtain uniform white light.

Fourth Embodiment

Next, a fourth embodiment of the present invention will be explained with reference to FIGS. 20 to 23. In the fourth embodiment, an arrangement pattern of the light sources is altered from the first embodiment and other configuration is similar to the first embodiment. In the fourth embodiment, the same components and parts as the first embodiment are indicated by the same symbols and will not be explained.

Figure 20:
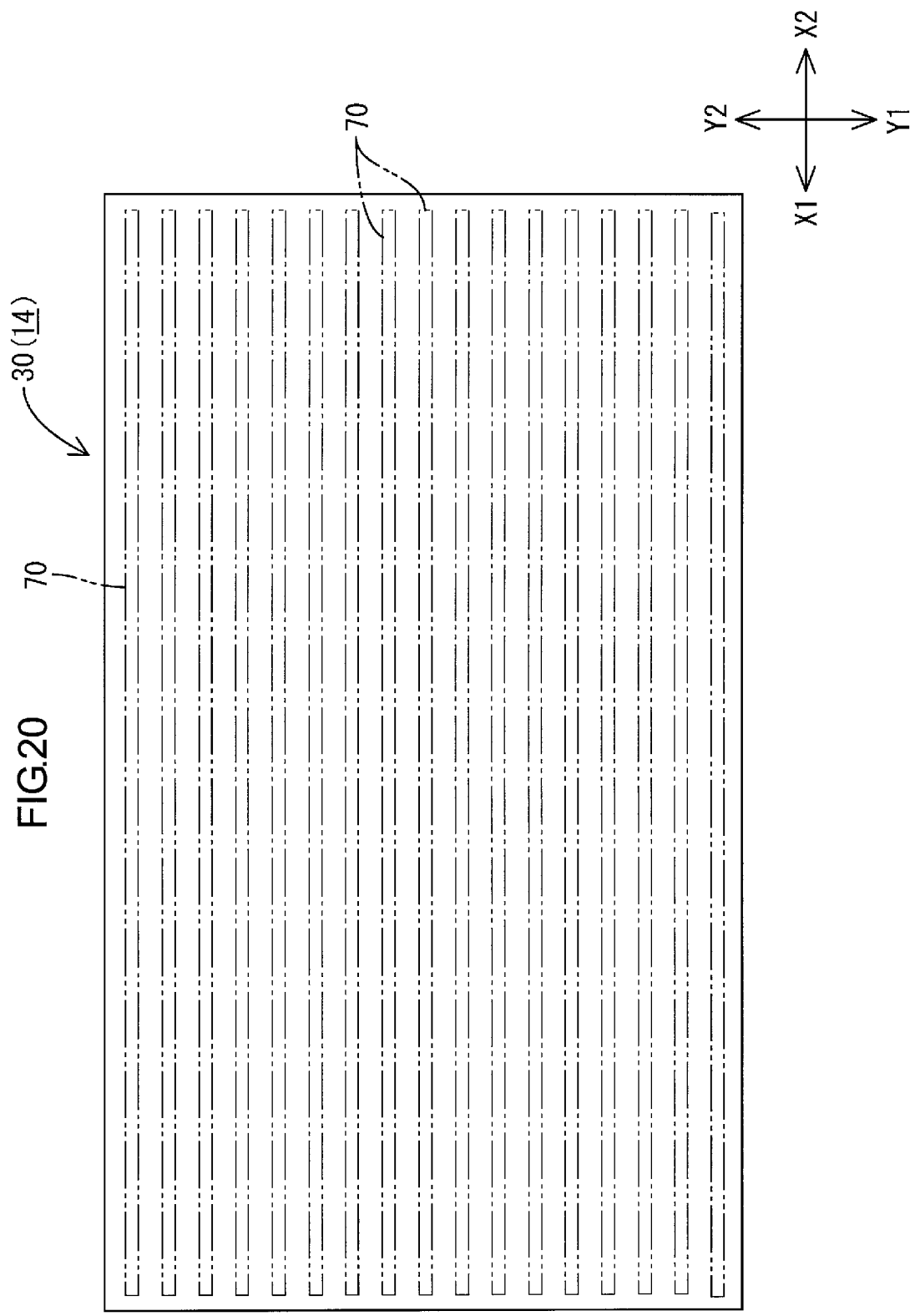
FIG. 20 is a plan view illustrating a general construction of a chassis included in a backlight device according to a fourth embodiment of the present invention.
Figure 22:
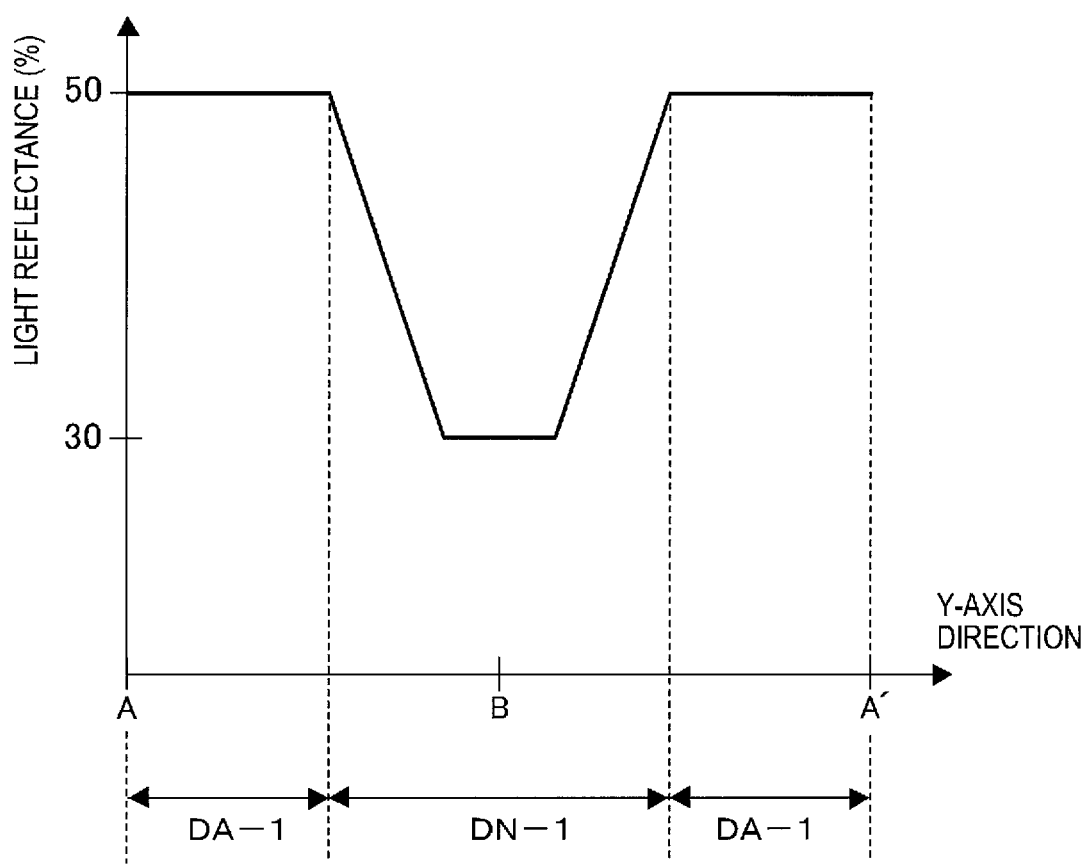
FIG. 22 is a graph illustrating a light reflectance change in the short-side direction of the diffuser plate.
Figure 23:
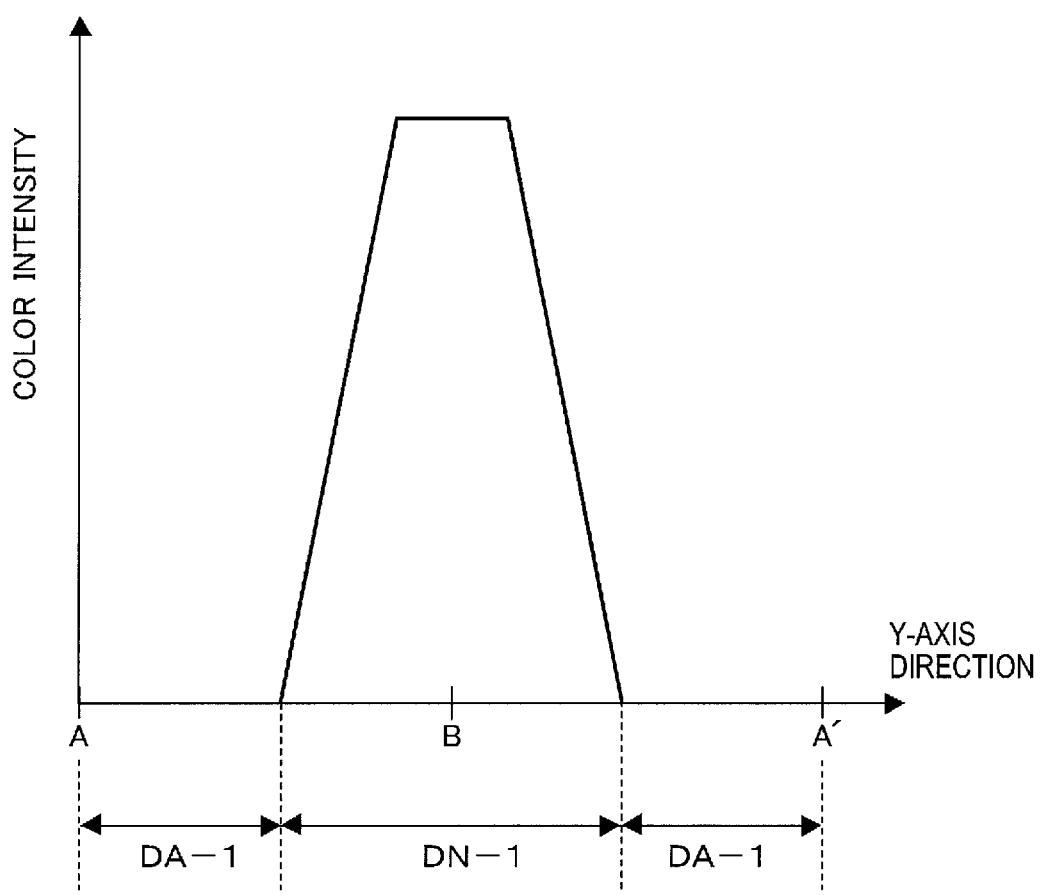
FIG. 23 is a graph illustrating a color intensity change in the short-side direction of the diffuser plate.

FIG. 20 is a plan view illustrating a general construction of a chassis included in a backlight device. FIG. 21 is an enlarged plan view illustrating a general configuration of a surface of a diffuser plate that faces cold cathode tubes. FIG. 22 is a graph illustrating a light reflectance change in the short-side direction of the diffuser plate. FIG. 23 is a graph illustrating a color intensity change in the short-side direction of the diffuser plate. In FIGS. 22 and 23, the positions of the diffuser plate that overlap the cold cathode tube 70 are indicated by A and A'.

As illustrated in FIG. 20, cold cathode tubes (light source) 70 are formed in an elongated tubular shape and they are arranged parallel to each other in an entire area of the bottom plate 30 of the chassis 14 such that their length (axial direction) matches a long-side of the chassis 14. A certain gap is provided between the adjacent cold cathode tubes 70, 70.

As illustrated in FIG. 21, on a surface of a diffuser plate 550a that faces the cold cathode tubes 70, the light reflecting portion 40 that is configured by a white dot pattern is formed mainly in a light source overlapping portion DA-1. The dot pattern is formed by printing on a surface of the diffuser plate 550a a paste containing metal oxide (such as titanium oxide) having good light reflectivity. An area of each dot of the light reflecting portion 40 is greatest in the portion of the diffuser plate 550a that overlaps the cold cathode tube 70 (light source overlapping portion DA-1). In the empty area overlapping portion DN-1, an area of each dot of the light reflecting portion 40 decreases in a continuous manner from a portion closer to the cold cathode tube 70 toward a portion farther therefrom. Therefore, as illustrated in FIG. 22, the light reflectance of the diffuser plate 550a is greatest in the light source overlapping portions DA-1 and decreases in a continuous manner in the empty area overlapping portion DN-1 from the portion closer to the light source overlapping portion DA-1 toward a portion farther therefrom.

The color adjustment portion 50 is formed mainly on the empty area overlapping portion DN-1 of the diffuser plate 550a. The color adjustment portion 50 is configured by a dot pattern that provides yellow. The dot pattern is formed by printing phthalocyanine-type yellow pigment on a surface of the diffuser plate 550a. An area of each dot of the color adjustment portion 50 is greatest in a portion that is farthest from the cold cathode tube 70 (the light source overlapping portion DA-1) and decreases in a continuous manner as is closer to the cold cathode tube 70. Therefore, as illustrated in FIG. 23, in the empty area overlapping portion DN-1, the yellow color intensity of the diffuser plate 550a is greatest in the portion that is farthest from the cold cathode tube 70 (the light source overlapping portion DA-1) and decreases as is closer to the cold cathode tube 70.

With the above configuration, light output from the cold cathode tubes 70 first reaches the light source overlapping portions DA-1 of the diffuser plate 550a. The light source overlapping portion DA-1 that includes the light reflecting portion 40 thereon has high light reflectance. Therefore, most of the light reflects off the light source overlapping portion DA-1, and the brightness of illumination light is suppressed with respect to the light emission amount from the cold cathode tubes 70. On the other hand, the light that reflects off the light source overlapping portion DA-1 is further reflected in the chassis 14 and the light reaches the empty area overlapping portion DN-1. The light reflectance of the empty area overlapping portion DN-1 is relatively low and a larger amount of light passes through the empty area overlapping portion DN-1 and thus predetermined brightness of illumination light is achieved. This prevents occurrence of lamp images and substantially a uniform brightness distribution is achieved in the backlight device 12. Further, in the present embodiment, the color adjustment portion 50 that provides yellow is formed mainly on the empty area overlapping portion DN-1 of the diffuser plate 550a. The light of a specific color phase may be absorbed (or reflected) by the light reflecting portion formed on the diffuser plate 550a. Therefore, a part of illumination light may take on a blue tinge in a portion away from the cold cathode tube 70 and uniform white light may not be obtained. The color adjustment portion 50 that provides yellow is formed in the empty area overlapping portions DN-1. Accordingly, the light of a blue color phase is absorbed by the color adjustment portion 50 and uniform white light is obtained.

First Modification of Fourth Embodiment

Figure 24:
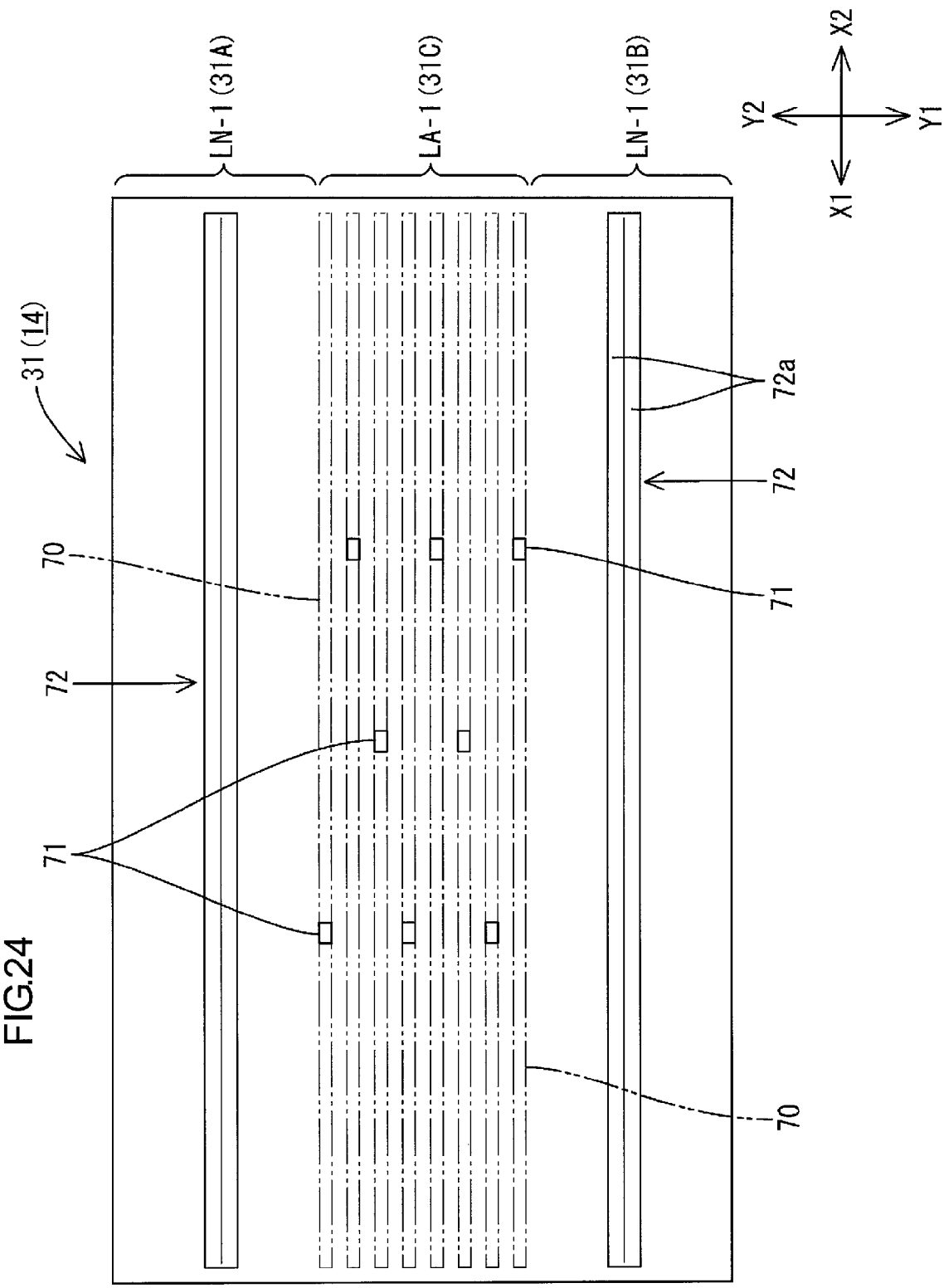
FIG. 24 is a general plan view illustrating an arrangement of cold cathode tubes in a chassis according to another modification.

The present invention is not limited to the fourth embodiment, and may include a following modification. The arrangement pattern of the cold cathode tubes 70 may be altered as illustrated in FIG. 24. FIG. 24 is a plan view illustrating a general construction of a chassis included in the backlight device.

The cold cathode tubes 70 are formed in an elongated tubular shape. A plurality of cold cathode tubes 70 are arranged in a portion of the chassis 14 such that a long-side direction (axial direction) thereof matches the long-side direction of the chassis 14 and they are arranged parallel to each other. More specifically, as illustrated in FIG. 24, a bottom plate 31 of the chassis 14 (a portion facing a diffuser plate 550a) is defined in the short-side direction equally in a first end portion 31A, a second end portion 31B that is located at an end opposite from the first end portion 31A and a middle portion 31C that is sandwiched between the first end portion 31A and the second end portion 31B. The cold cathode tubes 70 are arranged in the middle portion 31C of the bottom plate 31 and a light source installation area LA-1 is formed in the middle portion 31C. On the other hand, no cold cathode tube 70 is arranged in the first end portion 31A and the second end portion 31B of the bottom plate 31 and an empty area LN-1 is formed in the first end portion 31A and the second end portion 31B.

In the light source installation area LA-1 of the bottom plate 31 of the chassis 14, the cold cathode tubes 70 are held by lamp clips (not shown) to be supported with a small gap between the cold cathode tubes 70 and the bottom plate 31 of the chassis 14. Heat transfer members 71 are disposed in the gap so as to be in contact with a part of the cold cathode tube 70 and the bottom plate 31. Heat is transferred from the cold cathode tubes 17 that are lit and have high temperature to the chassis 14 via the heat transfer members 71. Therefore, the temperature of the cold cathode tubes 70 is lowered at the portions in which the heat transfer members 71 are arranged and the coldest points are forcibly generated there. As a result, the brightness of each one of the cold cathode tubes 70 is improved and this contributes to power saving.

In each of the empty areas LN-1 of the bottom plate 31 of the chassis 14, that is, in each of the first end portion 31A and the second end portion 31B of the bottom plate 31, a convex reflecting portion 72 extends along the long-side direction of the bottom plate 31. The convex reflecting portion 72 is made of a synthetic resin and has a surface in white color that provides high light reflectivity. Each convex reflecting portion 72 has two sloped surfaces 72a, 72a that face the cold cathode tubes 70 and are sloped toward the bottom plate 31. The convex reflecting portion 72 is provided such that its longitudinal direction matches an axial direction of the cold cathode tubes 70 arranged in the light source installation area LA-1. One sloped surface 72a directs light emitted from the cold cathode tubes 70 to the light guide plate 550a. The sloped surfaces 72a of the convex reflecting portion 72 reflect the light emitted from the cold cathode tubes 70 to the diffuser plate 550a side. Accordingly, the emission light is efficiently used.

With the above configuration, the cold cathode tubes 70 are arranged only in the middle portion 31 of the bottom plate 31 of the chassis 14. Therefore, compared to the case in that the cold cathode tubes 70 are installed evenly in the entire chassis 14, the number of cold cathode tubes 70 can be reduced. This achieves a low cost and power saving of the backlight device 12.

Second Modification of Fourth Embodiment

Figure 25:
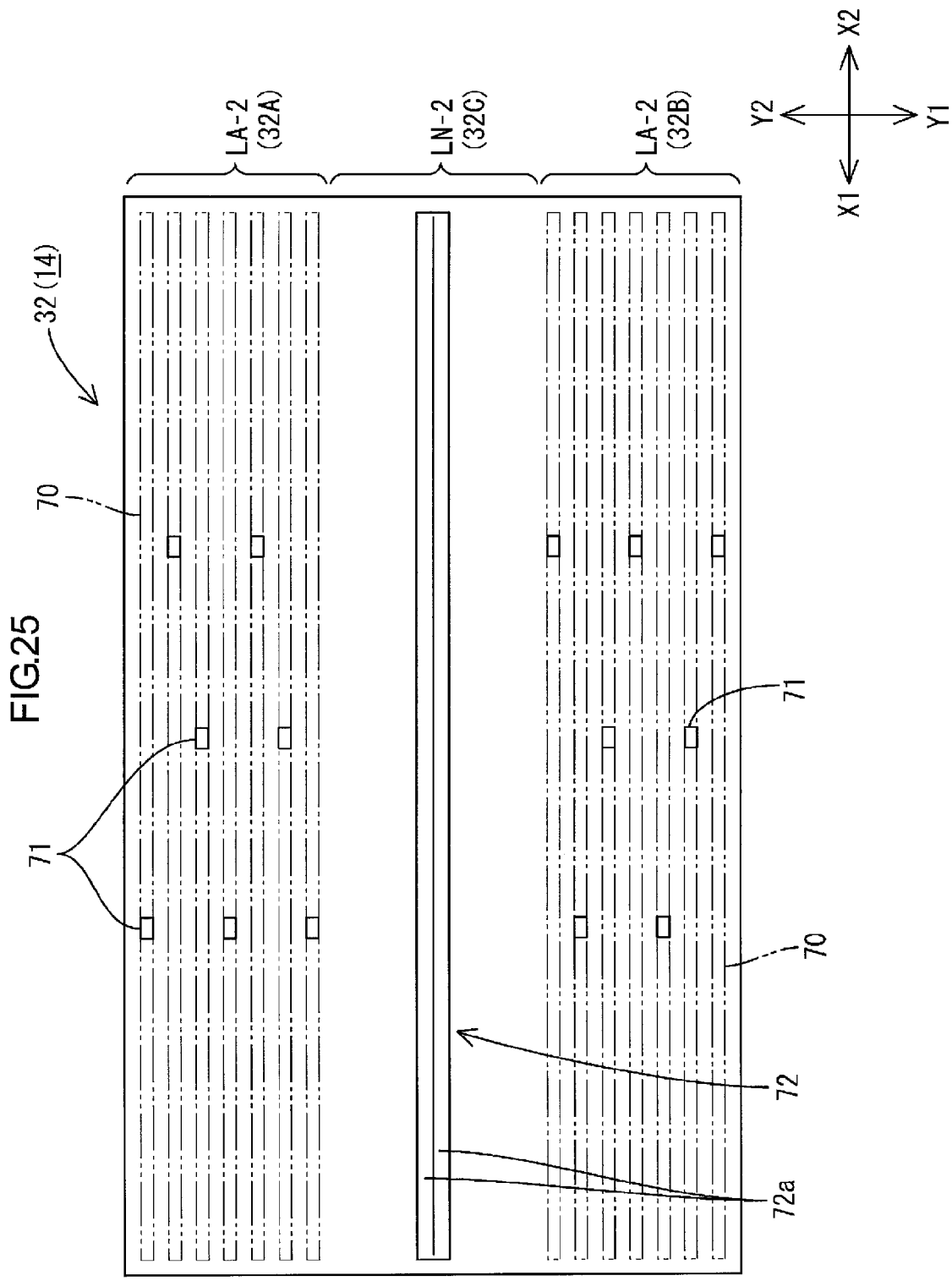
FIG. 25 is a general plan view illustrating an arrangement of cold cathode tubes in a chassis according to additional modification.

The arrangement pattern of the cold cathode tubes 70 may be altered as illustrated in FIG. 25. FIG. 25 is a plan view illustrating a general construction of a chassis included in the backlight device.

As illustrated in FIG. 25, a bottom plate 32 of the chassis (a portion facing the diffuser plate 550a) is defined in the short-side direction equally in a first end portion 32A, a second end portion 32B that is located at an end opposite from the first end portion 32A and a middle portion 32C that is sandwiched between the first end portion 32A and the second end portion 32B. The cold cathode tubes 70 are arranged in the first end portion 32A and the second end portion 32B of the bottom plate 32 and light source installation areas LA-2 are formed in the first end portion 32A and the second end portion 32B. On the other hand, no cold cathode tube 70 is arranged in the middle portion 32C of the bottom plate 32 and an empty area LN-2 is formed in the middle portion 32C.

With the above configuration, the cold cathode tubes 70 are arranged in the first end portion 32A and the second end portion 32B of the bottom plate 32 of the chassis 14, and no cold cathode tube 70 is arranged in the middle portion 32C. Therefore, compared to the case in that the cold cathode tubes 70 are installed evenly in the entire chassis 14, the number of cold cathode tubes 70 can be reduced. This achieves a low cost and power saving of the backlight device 12.

Fifth Embodiment

Next, a fifth embodiment of the present invention will be explained with reference to FIGS. 26 to 30. In the fifth embodiment, the arrangement pattern of the light sources is altered from the first embodiment and other configuration is similar to the first embodiment. In the fifth embodiment, the same components and parts as the first embodiment are indicated by the same symbols and will not be explained.

Figure 26:
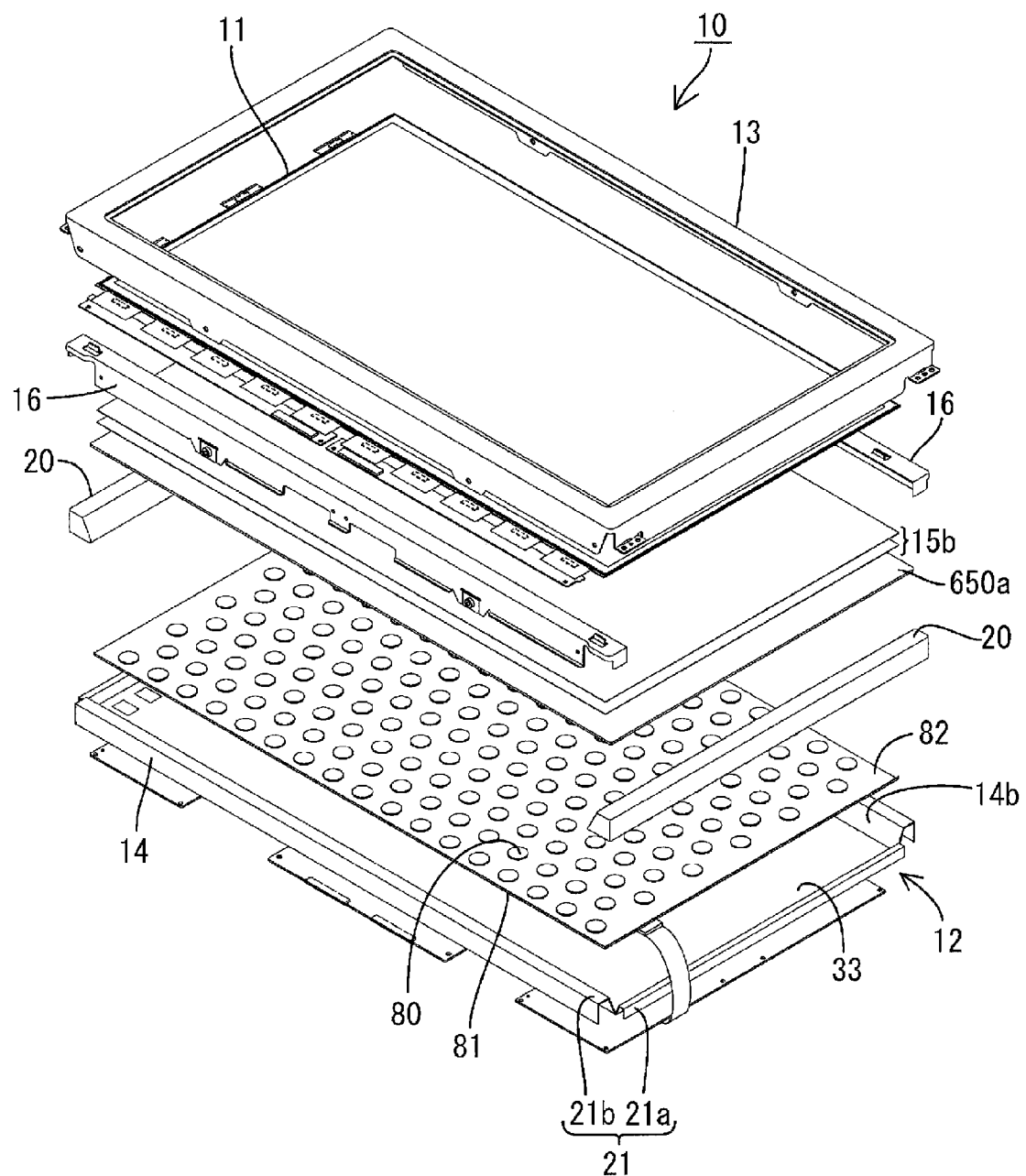
FIG. 26 is an exploded perspective view illustrating a general construction of a liquid crystal display device according to a fifth embodiment of the present invention.
Figure 27:
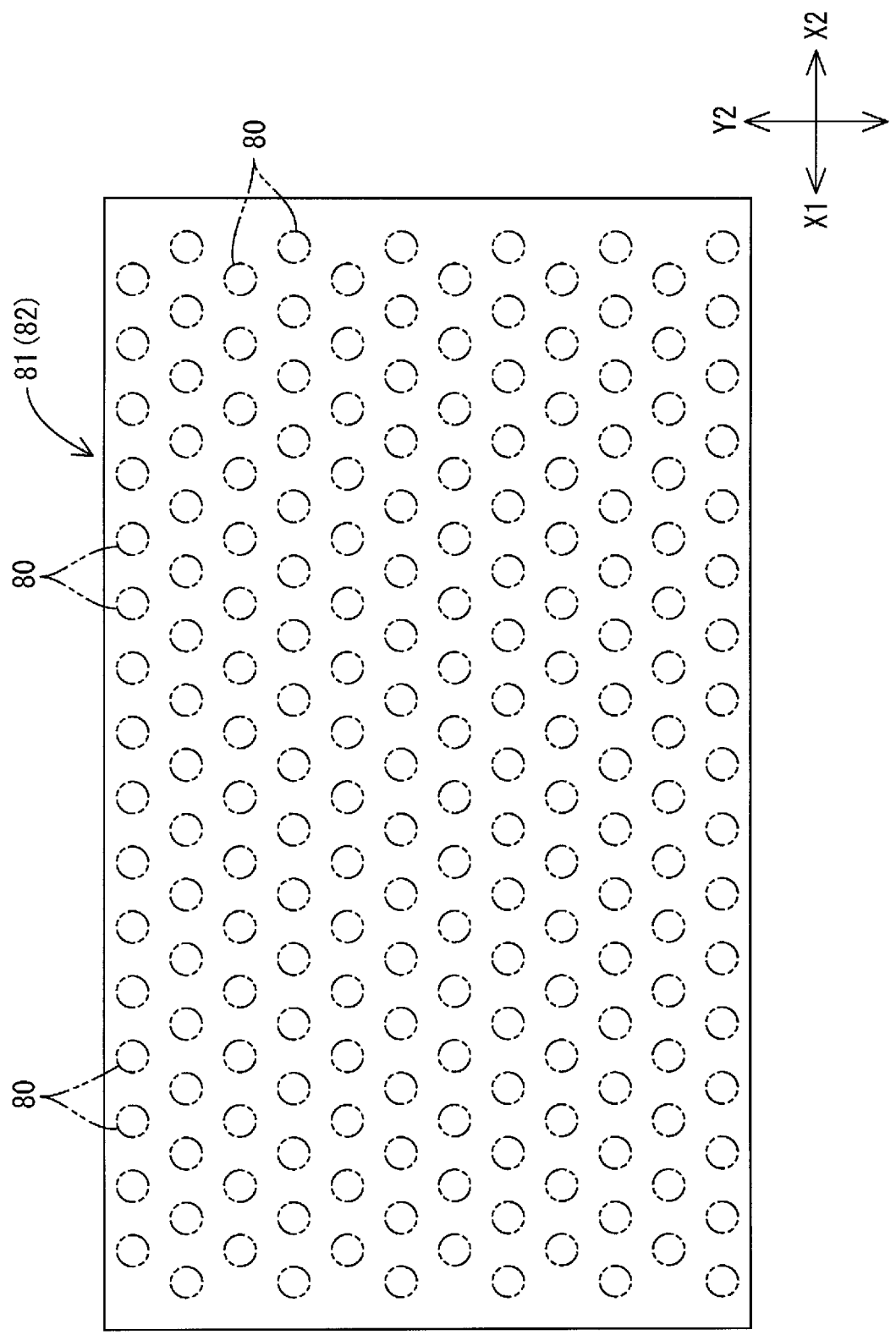
FIG. 27 is a general plan view illustrating an arrangement pattern of LED light sources in a chassis.
Figure 28:
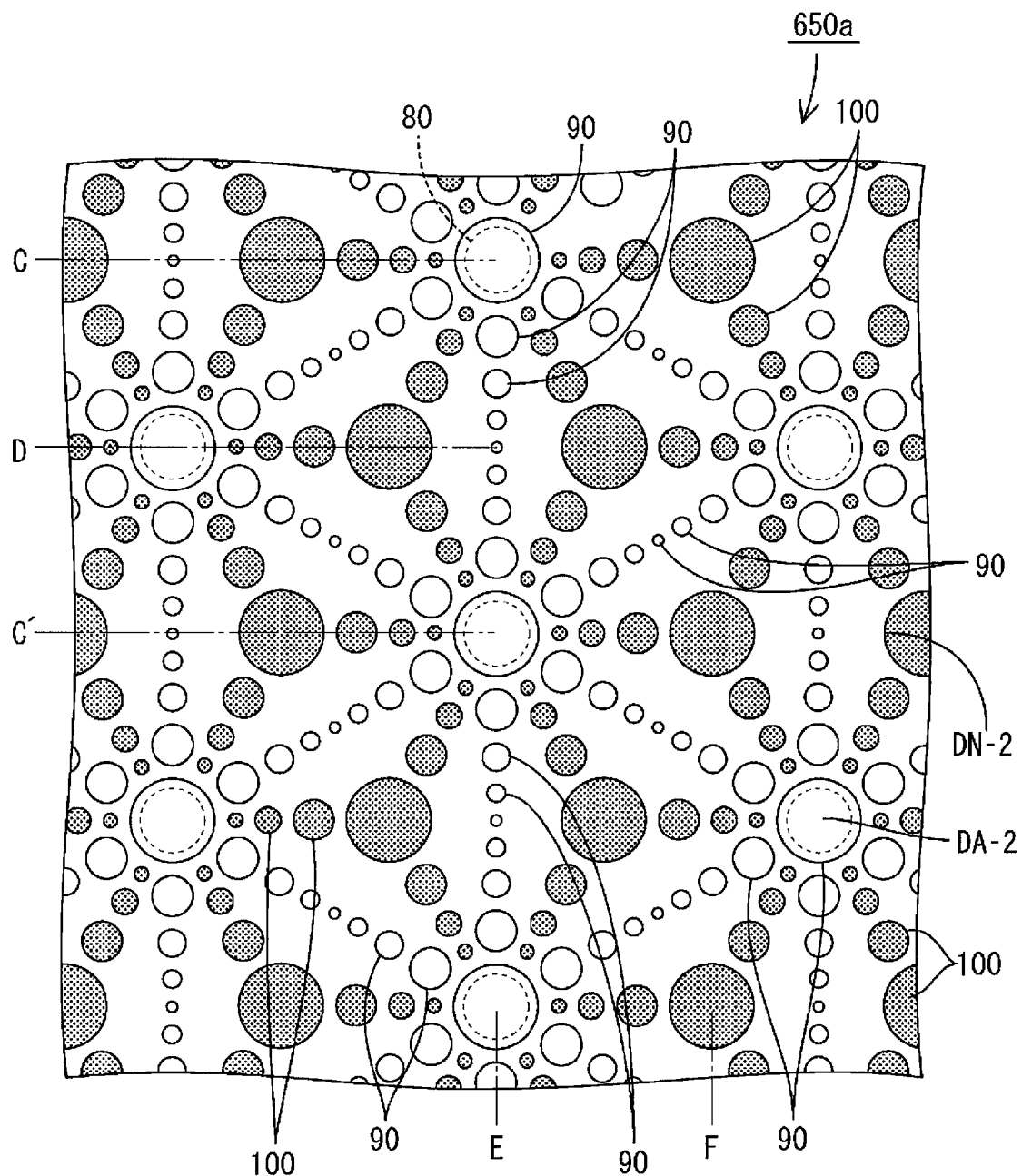
FIG. 28 is a typical view illustrating an arrangement pattern of a light reflecting portion and a color adjustment portion formed on a diffuser plate.
Figure 29:
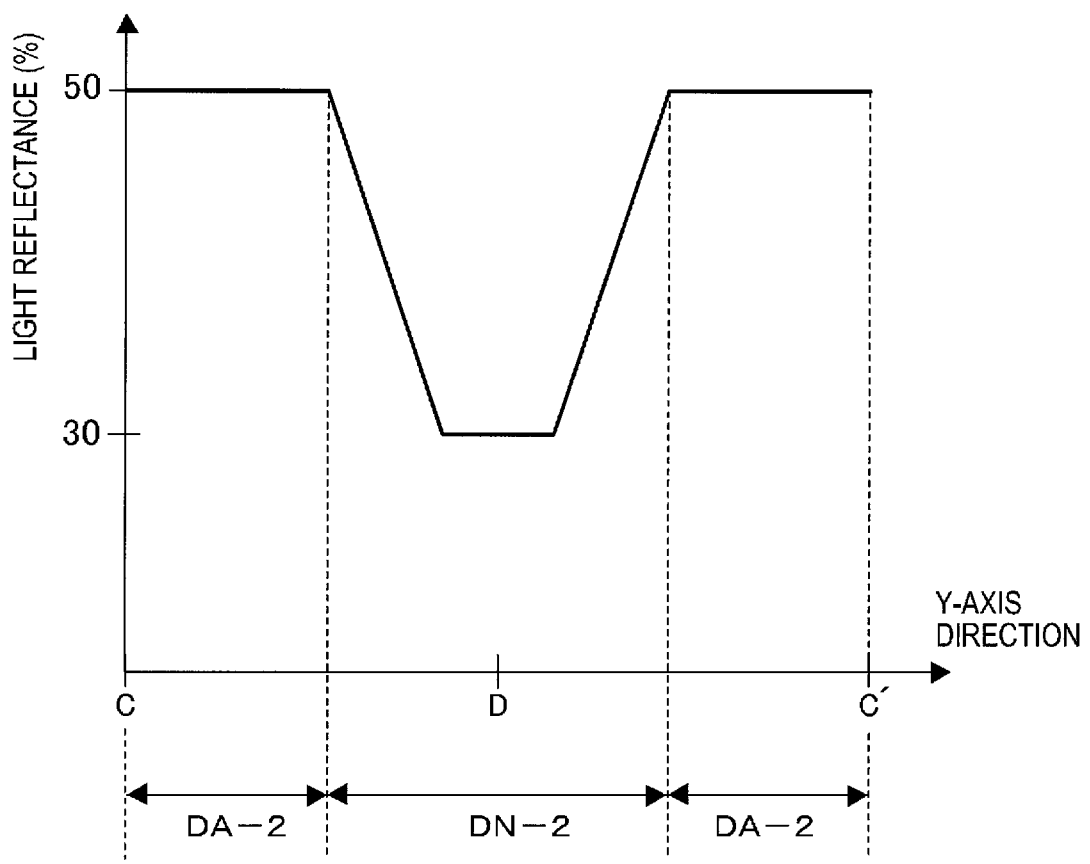
FIG. 29 is a graph illustrating a reflectance change in the short-side direction of the diffuser plate.
Figure 30:
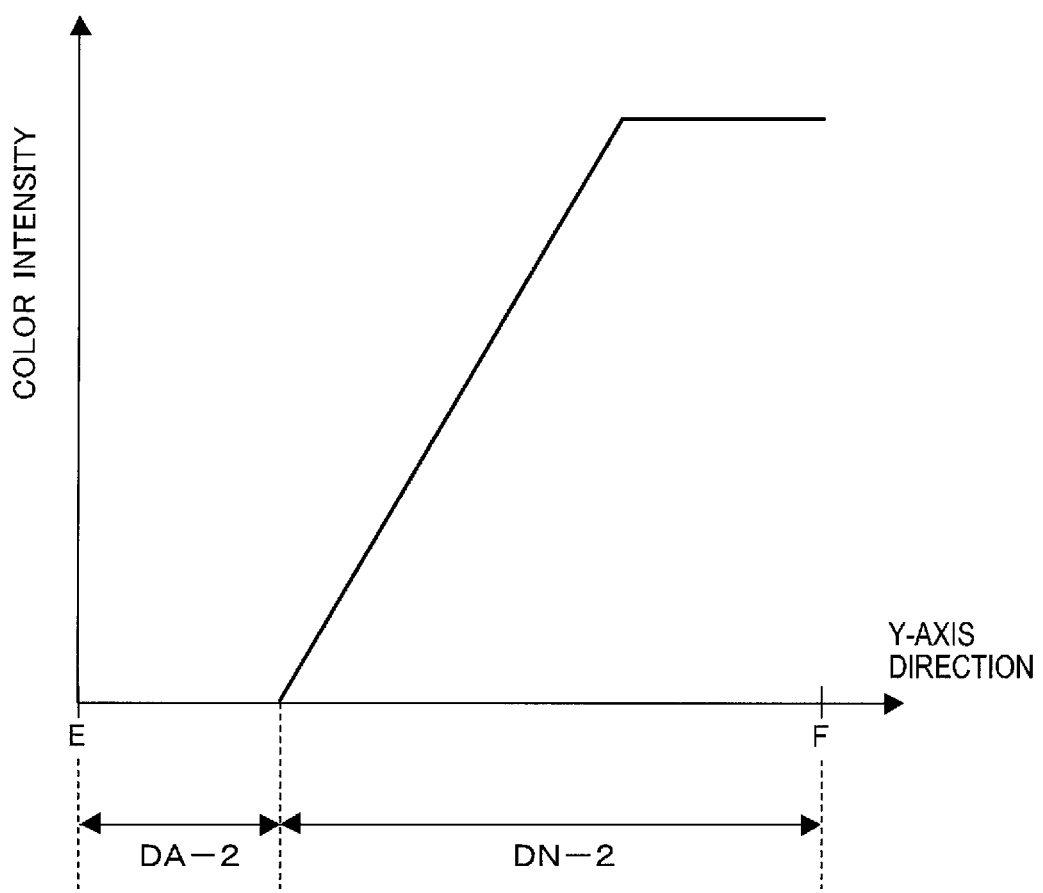
FIG. 30 is a graph illustrating a color intensity change in the short-side direction of the diffuser plate.

FIG. 26 is an exploded perspective view illustrating a general construction of a liquid crystal display device. FIG. 27 is a general plan view illustrating an arrangement pattern of LED light sources in a chassis. FIG. 28 is a typical view illustrating an arrangement pattern of a light reflecting portion and a color adjustment portion formed on a diffuser plate. FIG. 29 is a graph illustrating a reflectance change in the short-side direction of the diffuser plate. FIG. 30 is a graph illustrating a color intensity change in the short-side direction of the diffuser plate. In FIGS. 29 and 30, the points that overlap an LED light source are indicated by C and C'.

As illustrated in FIG. 26, an LED board 81 is disposed on an inner surface of a bottom plate 33 of the chassis 14. LED light sources (light sources) 80 are mounted on the LED board 81. The LED board 81 includes a light reflecting sheet 82 and a plurality of LED light sources 80. The light reflecting sheet 82 is disposed on a light output side surface of the LED board 81 (on a side that faces a diffuser plate 650a). The LED light sources 80 are arranged to be exposed from openings (not shown) formed in the light reflecting sheet 82. Each LED light source 80 is surrounded by opening edge of the opening formed in the light reflecting sheet 82. In the present embodiment, the LED board 81 is formed of one plate corresponding to the liquid crystal panel 11. However, the LED board 81 may be divided into several pieces and the divided pieces of LED board 81 may be arranged on a plane.

The light reflecting sheet 82 provided on the LED board 81 is a synthetic resin sheet having a surface in white color that provides high light reflectivity. It is placed so as to cover almost entire surface of the LED board 81 except the portions in which the LED light sources 80 are arranged.

Each LED light source 80 emits white light. Each LED light source 80 may have three LED chips (not shown) each of which emits light of single color of red, green and blue or may have a blue LED chip and a yellow phosphor. The LED light sources 80 are arranged on a plane surface in a hexagonal close-packed arrangement. Therefore, each interval between the adjacent LED light sources 80, 80 is equal.

As illustrated in FIG. 28, two kinds of dot patterns are formed on the diffuser plate 650a. One of the dot patterns configures a light reflecting portion 90 that is formed by printing a paste containing metal oxide having good light reflectivity (such as titanium oxide) on a surface of the diffuser plate 650a. In each portion of the diffuser plate 650a that overlaps the LED light source (light source overlapping portion DA-2), the light reflecting portion 90 is formed over an entire area of each portion that overlaps the LED light source

80. Namely, the light reflecting portion 90 is formed by forming each dot all over the entire area of the light source overlapping portion DA-2. Further, the light reflecting portion 90 is also formed in a portion of the diffuser plate 650a that does not overlap the LED light source 80 (empty area overlapping portion DN-2). The area of each dot continuously reduces in a direction away from the light source overlapping portion DA-2. In a portion farthest from the light source overlapping portion DA-2, that is, a portion that overlaps a middle portion between the adjacent LED light sources 80, (indicated by D in FIGS. 28 and 29), a dot area of the light reflecting portion 90 is smallest. Therefore, as illustrated in FIG. 29, the light reflectance of the diffuser plate 650a is highest in the light source overlapping portions DA-2 and decreases in a continuous manner in the empty area overlapping portion DN-2 as is farther away from the light source overlapping portions DA-2.

The other one of the dot patterns configures a color adjustment portion 100. The color adjustment portion 100 is formed by printing phthalocyanine-type yellow pigment on the empty area overlapping portion DN-2. The color adjustment portion 100 is formed such that an area of each dot decreases in a continuous manner from a center of the empty area overlapping portion DN-2 (indicated by F in FIGS. 28 and 30) that is farthest from the adjacent three LED light sources 80, 80, 80 toward the light source overlapping portion DA-2 corresponding to each of the adjacent three LED light sources 80, 80, 80. Namely, in the empty area overlapping portion DN-2, an area of each dot of the color adjustment portion 100 increases in a continuous manner from a portion closer to the light source overlapping portion DA-2 toward a portion farther away therefrom. Therefore, as illustrated in FIG. 30, the yellow color intensity of the diffuser plate 650a is strongest in a middle portion of the empty area overlapping portion DN-2 (indicated by F in FIG. 30) and decreases as is closer to the light source overlapping portion DA-2. The light source overlapping portion DA-2 does not provide yellow color but provides color of the light reflecting portion 90.

With the above configuration, light output from the LED light source 80 first reaches the light source overlapping portion DA-2 of the diffuser plate 650a. The light source overlapping portion DA-2 that includes the light reflecting portion 90 thereon has high light reflectance. Therefore, most of the light reflects off the light source overlapping portion DA-2, and the brightness of illumination light is suppressed with respect to the light emission amount from the LED light source 80. On the other hand, the light that reflects off the light source overlapping portion DA-2 is further reflected by the reflecting sheet 82 in the chassis 14 and the light reaches the empty area overlapping portion DN-2. The light reflectance of the empty area overlapping portion DN-2 is relatively low and a larger amount of light passes through the empty area overlapping portion DN-2 and thus predetermined brightness of illumination light is achieved. Thus, substantially a uniform brightness distribution is achieved in the backlight device 12. The light of a specific color phase may be absorbed (or reflected) by the light reflecting portion 90 formed on the diffuser plate 650a. Therefore, a part of illumination light may take on a blue tinge in a portion away from the LED light source 80 and uniform white light may not be obtained. In the present embodiment, the color adjustment portion 100 that provides yellow is formed on the empty area overlapping portion DN-2 of the diffuser plate 650a. Accordingly, the light of a blue color phase is absorbed by the color adjustment portion 100 and uniform white light is obtained.

Modification of Fifth Embodiment

Figure 31:
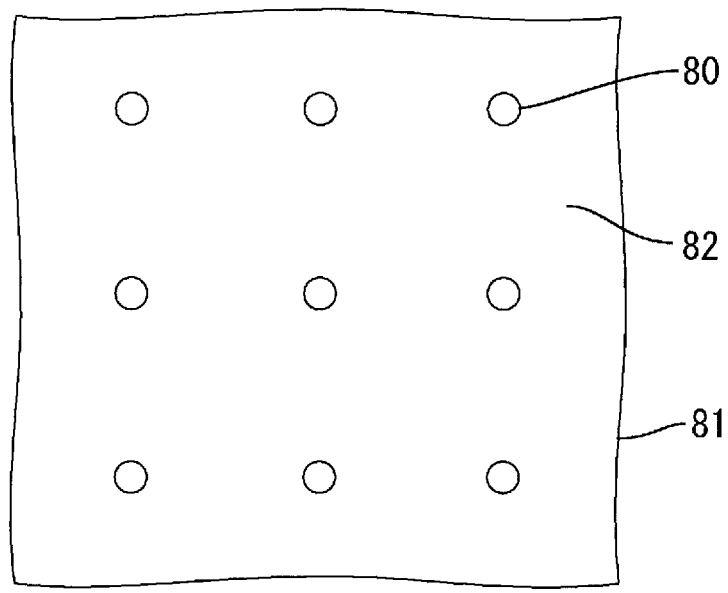
FIG. 31 is a typical view illustrating an arrangement pattern of LED light sources according to one modification.
Figure 32:
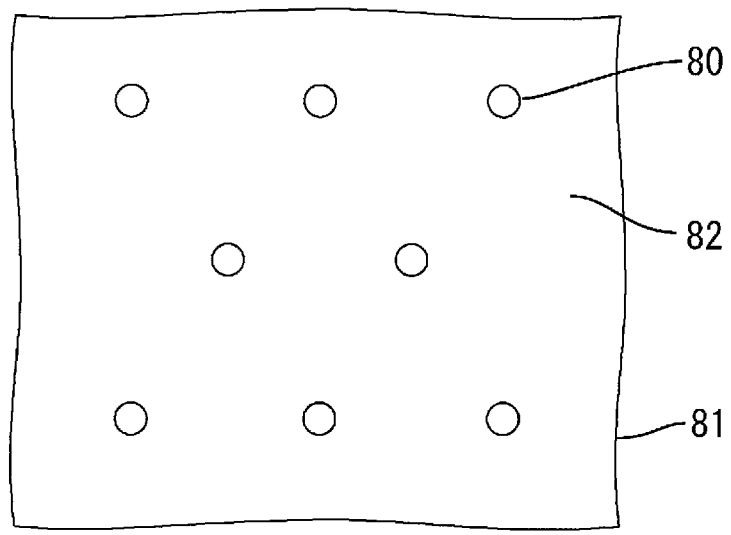
FIG. 32 is a typical view illustrating an arrangement pattern of LED light sources according to another modification.

The LED light sources 80 may be arranged on the LED board 81 as illustrated in FIGS. 31 and 32 as a modification of the fifth embodiment. In the fifth embodiment, the LED light sources 80 are arranged in a hexagonal close-packed arrangement so that the adjacent LED light sources 80 are arranged at equal intervals. However, as illustrated in FIG. 31, the LED light sources 80 may be aligned vertically and horizontally to be arranged in a grid. Also, as illustrated in FIG. 32, the LED light sources 80 may be aligned vertically and horizontally to be arranged in a staggered arrangement such that the adjacent LED light sources 80 are offset from each other.

Other Embodiments

The embodiments of the present invention have been described, however, the present invention is not limited to the above embodiments explained in the above description and the drawings. The following embodiments may be included in the technical scope of the present invention, for example.

(1) In the above embodiments, each dot of the dot pattern of the light reflecting portion and the color adjustment portion is formed in a round. However, the shape of each dot is not limited thereto but may be any shape such as a square or a polygonal shape.

(2) In the above embodiments, the optical sheet set includes a combination of a diffuser plate, a diffuser sheet, a lens sheet and a reflective polarizing plate. Two diffuser plates may be layered as optical sheets.

(3) The arrangement patterns of the light sources and the formation patterns of the color adjustment portion may be arbitrarily combined.

(4) In the above embodiments, the light source installation area is provided in the middle portion of the bottom plate of the chassis. The light source installation area may be provided in any other positions according to the amount of rays of light from the light source and use conditions of the backlight device. The light source installation area may be provided in end portions of the bottom plate or may be provided in the middle portion and one end portion of the bottom plate.

The invention claimed is:
1. A lighting device comprising:
a light source;
a chassis configured to house the light source and including an opening configured to permit light from the light source to pass there through, the chassis including a light source installation area in which the light source is arranged and a light source non-installation area in which no light source is arranged; and
an optical member disposed so as to face the light source and cover the opening, the optical member including:
a light source overlapping portion that overlaps the light source installation area;
a light source non-overlapping portion that overlaps the light source non-installation area;
a light reflecting portion included in at least the light source overlapping portion and configured to reflect light from the light source to set a light reflectance in a surface area of the light source overlapping portion relatively higher than a light reflectance in a surface area of the light source non-overlapping portion; and
color adjustment members arranged in the light source overlapping portion and in the light source non-overlapping portion such that a total area of the color adjustment members in the light source overlapping portion is different from a total area of the color adjustment members in the light source non-overlapping portion to adjust color intensity in the light source overlapping portion and the non-light source overlapping portion, each of the color adjustment members in at least the light-source non-overlapping portion contains coloring material configured to produce any one of yellow and red colors.

2. The lighting device according to claim 1, wherein the color adjustment members are configured such that color intensity of one of yellow and red changes from the light source non-overlapping portion toward the light source overlapping portion.

3. The lighting device according to claim 1, wherein the color adjustment portions are configured such that color intensity of one of yellow and red increases as the color adjustment members extend farther away from the light source.

4. The lighting device according to claim 1, wherein the color adjustment members are configured such that color intensity of one of yellow and red is greatest in a portion that is farthest from the light source.

5. The lighting device according to claim 1, wherein the light reflecting portion is configured by a dot pattern having light reflectivity.

6. The lighting device according to claim 1, wherein the light reflectance of the optical member decreases in a continuous and gradual manner from a portion having high light reflectance to a portion having low light reflectance.

7. The lighting device according to claim 1, wherein the optical member is a light diffusing member configured to diffuses light from the light source.

8. A display device comprising:

the lighting device according to claim 1; and a display panel configured to provide display using light from the lighting device.

9. The display device according to claim 8, wherein the display panel is a liquid crystal display panel using liquid crystal.

10. A television receiver comprising the display device according to claim 8.

* * * * *